(12) United States Patent
Cho et al.

(10) Patent No.: US 9,179,092 B2
(45) Date of Patent: Nov. 3, 2015

(54) SYSTEM AND METHOD PRODUCING HIGH DEFINITION VIDEO FROM LOW DEFINITION VIDEO

(75) Inventors: Yang Ho Cho, Hwaseong-si (KR); Du-sik Park, Suwon-si (KR); Ho Young Lee, Suwon-si (KR); Kyu Young Hwang, Suwon-si (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 155 days.

(21) Appl. No.: 12/923,439

(22) Filed: Sep. 21, 2010

(65) Prior Publication Data

US 2011/0075025 A1    Mar. 31, 2011

(30) Foreign Application Priority Data

Sep. 22, 2009  (KR) .................. 10-2009-0089503

(51) Int. Cl.
*H04N 7/01* (2006.01)
*G06T 3/40* (2006.01)

(52) U.S. Cl.
CPC ............ *H04N 7/0117* (2013.01); *G06T 3/4053* (2013.01); *H04N 7/0145* (2013.01)

(58) Field of Classification Search
USPC ........... 348/402.1, 458, 441, 620; 375/240.16
See application file for complete search history.

(56) References Cited

U.S. PATENT DOCUMENTS

| | | | |
|---|---|---|---|
| 6,184,935 B1 * | 2/2001 | Iaquinto et al. | 348/441 |
| 6,788,347 B1 * | 9/2004 | Kim et al. | 348/441 |
| 2006/0181643 A1 * | 8/2006 | De Haan | 348/458 |
| 2007/0247547 A1 * | 10/2007 | Liu et al. | 348/458 |
| 2008/0204592 A1 * | 8/2008 | Jia et al. | 348/402.1 |
| 2009/0110075 A1 * | 4/2009 | Chen et al. | 375/240.16 |
| 2010/0165207 A1 * | 7/2010 | Deng et al. | 348/620 |

FOREIGN PATENT DOCUMENTS

| | | |
|---|---|---|
| EP | 2 081 150 A1 | 7/2009 |
| JP | 2000-149052 | 5/2000 |
| JP | 2005-354124 | 12/2005 |
| JP | 2006-127241 | 5/2006 |
| JP | 2007-128342 | 5/2007 |
| JP | 2007-334625 | 12/2007 |
| JP | 2008-276380 | 11/2008 |
| JP | 2008-294950 | 12/2008 |

(Continued)

OTHER PUBLICATIONS

European search report issued Jan. 3, 2014 in corresponding European Patent Application No. 10177851.2.

(Continued)

*Primary Examiner* — Jefferey Harold
*Assistant Examiner* — Sihar Karwan
(74) *Attorney, Agent, or Firm* — Harness, Dickey & Pierce, P.L.C.

(57) ABSTRACT

Provided is system and a method of producing a high definition video from a low definition video. According to one or more embodiments, the method performs a trajectory estimation and a matching operation only with respect to a feature region pixel of a previous frame of the low definition video, which is different from all pixels of the previous frame, thereby reducing an amount of computation to improve efficiency of a memory, producing the high definition video in real time, and producing a more accurate high definition video with respect to a feature region.

7 Claims, 17 Drawing Sheets

(56) References Cited

FOREIGN PATENT DOCUMENTS

| | | |
|---|---|---|
| JP | 2009-005119 | 1/2009 |
| JP | 2009-037460 | 2/2009 |
| JP | 2009-70123 | 4/2009 |
| JP | 2009-124621 | 6/2009 |
| KR | 10-2007-0119879 | 12/2007 |
| WO | WO 2004/090812 A1 | 10/2004 |
| WO | WO 2008/091205 A1 | 7/2008 |
| WO | WO 2009/091259 A1 | 7/2009 |

OTHER PUBLICATIONS

Eekeren et al, Super-resolution on moving objects and background, Oct. 1, 2006, pp. 2709-2712, IEEE.

Zhao et al, Towards an overview of spatial up-conversion techniques, Proceedings of ISCE, Sep. 24, 2002, pp. 23-26.

Japanese Notice of Rejection issued Jun. 17, 2014 in corresponding Japanese Patent Application No. 2010-211405.

* cited by examiner

FIG. 9
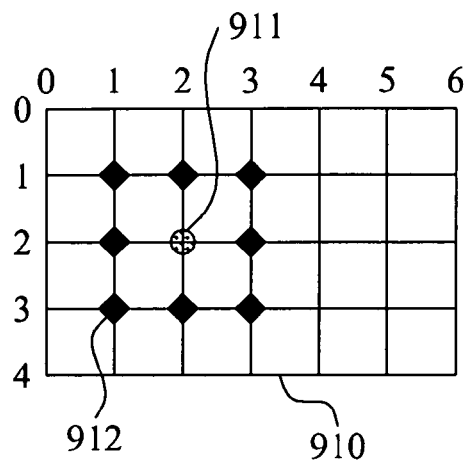
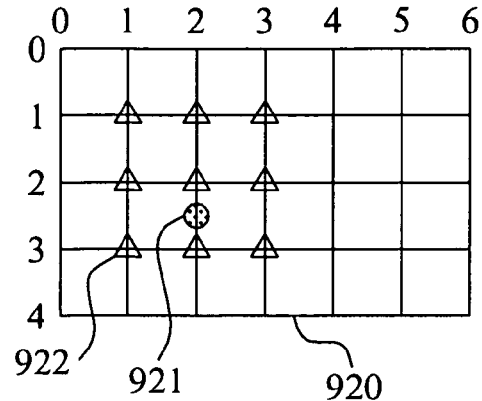
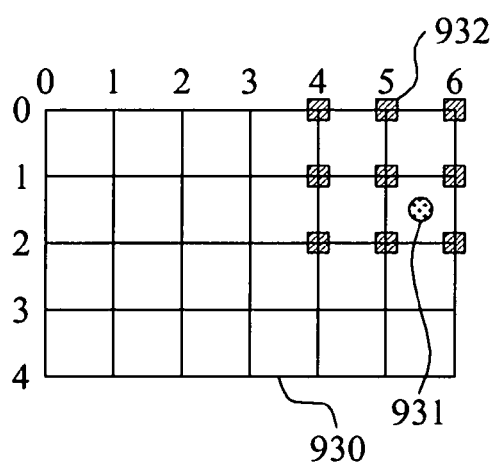
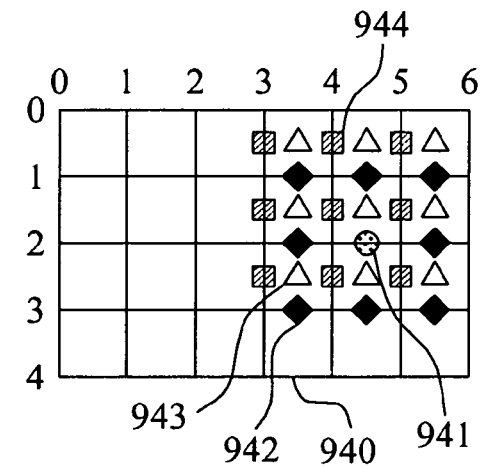

SYSTEM AND METHOD PRODUCING HIGH DEFINITION VIDEO FROM LOW DEFINITION VIDEO

CROSS-REFERENCE TO RELATED APPLICATIONS

This application claims the benefit of Korean Patent Application No. 10-2009-0089503, filed on Sep. 22, 2009, in the Korean Intellectual Property Office, the disclosure of which is incorporated herein by reference.

BACKGROUND

1. Field

One or more embodiments relate to a system and method of producing a high definition video from a low definition video, and more particularly, to a system and method of producing a high definition video using trajectory estimation and interpolation.

2. Description of the Related Art

Image magnification of a low definition video to a high definition video may be an important function of image equipment, and may be an equally important element that is extensively applicable in everyday life products such as camcorders, or in professional fields such as astronomy, health care, and the like. Recently, there have been an increased number of instances where image magnification have been applied, such as when converting a low definition video, obtained from a digital camera or a camcorder, into a high definition video, reproducing low definition video contents in a high definition display apparatus, or compressing a high definition video into a low definition video and then restoring the compressed low definition video to the high definition video. Accordingly, there may be an increase in a desire for image magnification to obtain high definition video from low definition video.

As one example, image magnification may be implemented using a combination of lenses. However, when magnification is carried out for high magnification using such an optical magnification scheme, this entails a significant increase in volume, weight, cost, and the like. To overcome these problems, image magnification schemes using digital image processing may be used. When using such digital image processing, the image magnification may be desirably implemented using a semiconductor chip, and thereby represent a relatively low cost in comparison with the optical magnification scheme. In addition, when the image magnification is used in conjunction with an existing optical magnification scheme, an image that is more effectively magnified at a high magnification may be obtained. Also, in terms of signal processing, the image magnification scheme may be used to maintain compatibility between systems using images that are different from one another by orders of magnitude, as well as being used to increase a resolution or magnitude of an image. The image magnification scheme may be applicable in reducing the amount of data required for expressing an image in association with image compression.

In terms of the signal processing or image processing, the image magnification scheme may have several approaches. In one approach, an image magnification scheme using interpolation of signals may be easily implemented and practically used. The interpolation of images may be a scheme that may expand intervals between discrete pixels of an original image, and estimate values between the expanded intervals to insert the estimated value into the expanded intervals, thereby obtaining effects in magnifying the image. In this instance, an image magnification method may be determined depending on a manner in which the values between the expanded intervals are estimated, and the magnified image may vary depending on the determined image magnification method.

For example, FIG. 14 illustrates a conventional image processing system where plural frames of a video sequence are input to the multi-frame memory, and more specifically a separate frame memory is required for each frame, e.g., when interpolating pixels within a current frame based on movement estimation from 10 previous frames 10 separate frame memories are required in the multi-frame memory. The multi-frame movement estimation unit 12 estimates movement for each pixel or block of a current frame in relation to the corresponding pixel or block from all previous frames. For example, movement estimation of each pixel may be based on at least 10 previous frames, requiring 10 separate movement estimations based on each of the previous frames for each of the pixels or blocks. From this review of all the previous frames for each pixel or block, an estimation of movement for each pixel or block can be estimated, such that the high resolution interpolation unit 14 can perform an interpolation of pixels or blocks for a current frame.

However, such an approach also requires substantial memory and processing resources, and accordingly results in increased costs, delay, and a limitation of the image conversion to being done in a more substantial memory and processing environment. As noted, a separate frame memory is required for each previous frame, and every pixel or block of the previous frames are stored in each separate frame memory. Further, as movement estimation is required for every pixel or block of a current frame for every previous frame relied upon for movement estimation, substantial processing is required which also requires substantial time. Accordingly, due to such drawbacks, such an image conversion approach cannot typically be implemented in more compact and mobile devices, and typically cannot be performed in a real-time manner. Therefore, there are substantial drawbacks with current image processing approaches for image magnification.

SUMMARY

According to an one or more embodiments, there is provided an image processing method, including performing trajectory estimation on pixels or blocks of a current frame, including pixels or blocks corresponding to a feature region of the current frame, to identify trajectory estimated pixels when trajectory information of a previous frame is available, classifying the trajectory estimated pixels or blocks into a feature region and individually classifying pixels or blocks of the current frame, excluding the trajectory estimated pixels or blocks, respectively into one of the feature region and a uniform region in accordance with each respective spatial spectrum, matching feature region pixels or blocks of the feature region with feature region pixels or blocks of at least one previous frame, and projecting matched feature region pixels or blocks of the at least one previous frame and the corresponding trajectory estimated pixels or blocks into a high definition frame having a higher definition than the current frame, and interpolating pixels of the high definition frame, excluding the projected matched feature region pixels or blocks and the corresponding trajectory estimated pixels or blocks, based on the matched feature region pixels or blocks and the corresponding trajectory estimated pixels or blocks, and based on pixels or blocks of the uniform region.

According to an one or more embodiments, there is provided an image processing method of producing a high definition video from a low definition video, the method including individually classifying pixels or blocks of a current frame of the low definition video into a feature region and a uniform region in accordance with a respective spatial spectrum of each pixel or block, with pixels or blocks classified into the feature region respectively being feature region pixels or blocks, and producing a high definition video corresponding to the feature region based on a plurality of frames of the low definition video with respect to the feature region and based on pixel value information from at least one previous frame to the current frame, and producing a high definition video corresponding to the uniform region using interpolation at least between pixels or blocks of the current frame classified into the uniform region.

According to an one or more embodiments, there is provided an image processing method producing a high definition video from a low definition video, the method including determining feature region pixels of an i-th frame of the low definition video by performing respective trajectory estimation on feature region pixels of an (i−1)-th frame of the low definition video, determining pixel values of pixels of a frame of the high definition video corresponding to the i-th frame by matching the feature region pixels of the i-th frame with feature region pixels of at least one previous frame corresponding to the feature region pixels of the i-th frame, and determining, using interpolation, pixel values of the frame of the high definition video corresponding to the i-th frame that are not determined by the matching, wherein the matching of the feature region pixels of the i-th frame with feature region pixels of the at least one previous frame includes matching the feature region pixels of the i-th frame with only feature region pixels of the at least one previous frame, with the at least one previous frame including pixels in addition to the feature region pixels.

According to an one or more embodiments, there is provided an image processing method, including receiving an image and trajectory information of the received image, individually classifying pixels or blocks of the received image into a feature region and a uniform region in accordance with a respective spatial spectrum of each pixel of block, with pixels or blocks classified into the feature region respectively being feature region pixels or blocks, and producing a high definition image by interpolating at least between pixels or blocks within the uniform region and interpolating at least between pixels or blocks corresponding to the feature region pixels based on the received trajectory information.

According to an one or more embodiments, there is provided an image processing method, including individually classifying pixels or blocks of a first frame respectively into one of the feature region and a uniform region of the first frame in accordance with each respective spatial spectrum and storing pixel values and locations of pixels or blocks classified into the feature region of the first frame in a registration memory, as feature region pixels or blocks of the first frame, performing trajectory estimation on pixels or blocks of a second frame, subsequent to the first frame, including obtaining pixel values and locations of the feature region pixels or blocks of the first frame from the registration memory, and identifying trajectory estimated pixels or blocks of the second frame based on the obtained feature region pixels or blocks of the first frame, and storing pixel values and locations of the trajectory estimated pixels of blocks of the second frame in the registration memory, classifying the trajectory estimated pixels or blocks of the second frame into a feature region and individually classifying pixels or blocks of the second frame, excluding the trajectory estimated pixels or blocks of the second frame, respectively into one of the feature region and a uniform region of the second frame in accordance with each respective spatial spectrum, matching feature region pixels or blocks of the feature region of the second frame with feature region pixels or blocks of the first frame, and projecting matched feature region pixels or blocks of the first frame and the corresponding trajectory estimated pixels or blocks of the second frame into a high definition frame having a higher definition than the second frame, and interpolating pixels of the high definition frame, excluding the projected matched feature region pixels or blocks of the first frame and the corresponding trajectory estimated pixels or blocks of the second frame, based on the matched feature region pixels or blocks of the first frame and the corresponding trajectory estimated pixels or blocks of the second frame, and interpolating pixels of the high definition frame based on pixels or blocks of the uniform region of the second region.

According to an one or more embodiments, there is provided an image processing system, including a trajectory estimation unit to perform trajectory estimation on pixels or blocks of a current frame, including pixels or blocks corresponding to a feature region of the current frame, and classifying trajectory estimated pixels of blocks into the feature region, a region classification unit to individually classify pixels or blocks of the current frame, excluding the trajectory estimated pixels or blocks of the current frame, respectively into one of the feature region and a uniform region in accordance with each respective spatial spectrum, a registration unit to match feature region pixels or blocks of the feature region of the current frame with feature region pixels or blocks of at least one previous frame, and to project matched feature region pixels or blocks of the at least one previous frame and the corresponding trajectory estimated pixels or blocks into a high definition frame having a higher definition than the current frame, and a high resolution interpolation unit to interpolate pixels or blocks of the high definition frame, excluding the projected matched feature region pixels or blocks and the corresponding trajectory estimated pixels or blocks, based on the matched feature region pixels or blocks and the corresponding trajectory estimated pixels or blocks, and based on pixels or blocks of the uniform region.

According to an one or more embodiments, there is provided an image processing system producing a high definition video from a low definition video, the system including a region classification unit to individually classify pixels or blocks of a current frame of the low definition video into a feature region and a uniform region in accordance with a respective spatial spectrum of each pixel or block, with pixels or blocks classified into the feature region respectively being feature region pixels or blocks, and a high resolution interpolation unit to produce a high definition video corresponding to the feature region based on a plurality of frames of the low definition video with respect to the feature region and based on pixel value information from at least one previous frame, and to produce a high definition video corresponding to the uniform region using interpolation at least between pixels or blocks of the current frame classified into the uniform region.

According to an one or more embodiments, there is provided an image processing system producing a high definition video from a low definition video, the system including a trajectory estimation unit to determine feature region pixels of an i-th frame of the low definition video by performing respective trajectory estimation on feature region pixels of an (i−1)-th frame of the low definition video, a registration unit to determine pixel values of pixels of a frame of the high definition video corresponding to the i-th frame by matching the feature region pixels of the i-th frame with feature region pixels of at least one previous frame corresponding to the feature region pixels of the i-th frame and storing matched feature region pixels in a registration memory, and an interpolation unit to determine, using interpolation, pixel values of the frame of the high definition video corresponding to the i-th frame that are not determined by the matching, wherein the matching of the feature region pixels of the i-th frame with feature region pixels of the at least one previous frame includes matching the feature region pixels of the i-th frame with only feature region pixels of each of the at least one previous frame, with the at least one previous frame including pixels in addition to the feature region pixels.

Additional aspects and/or advantages will be set forth in part in the description which follows and, in part, will be apparent from the description, or may be learned by practice of one or more embodiments of the present invention.

BRIEF DESCRIPTION OF THE DRAWINGS

These and/or other aspects will become apparent and more readily appreciated from the following description of one or more embodiments, taken in conjunction with the accompanying drawings of which:

FIG. 9 illustrates matching feature region pixels, according to one or more embodiments;

DETAILED DESCRIPTION

Figure 1:
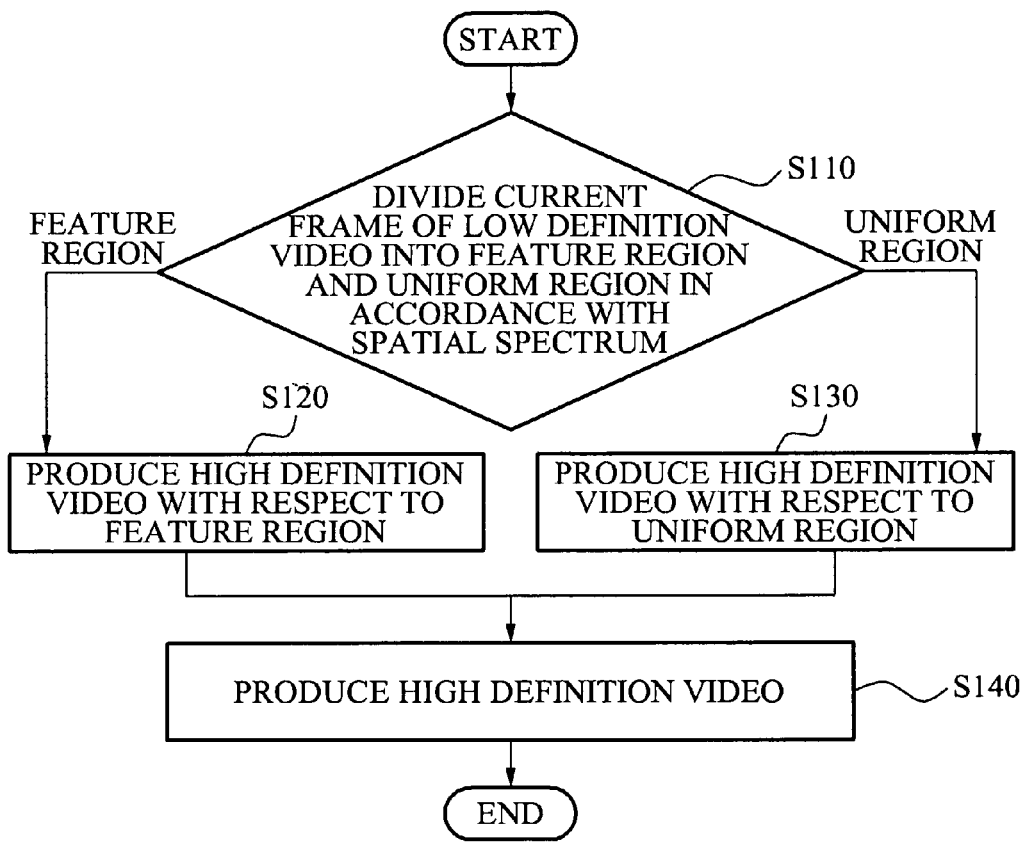
FIG. 1 is a flowchart illustrating a method of producing high definition video from low definition video according to one or more embodiments.

Reference will now be made in detail to one or more embodiments, illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention.

The term 'video' used throughout the present specification may designate all types of plural screens or images, such as screens or images that may be reproducible on a display. An 'image' may be a single frame of a video, e.g., with plural contiguous frames together making up the video, though all frames are not necessarily needed to be contiguous for the collection of images to be understood to be a video.

FIG. 1 is a flowchart illustrating a method of producing high definition video from low definition video, according to one or more embodiments.

Referring to FIG. 1, in operation S110, a current frame or image of a low definition video may be classified into one of a feature region and a uniform region in accordance with a spatial frequency (spatial spectrum), for example. The 'feature region' may designate portions of the frame where changes are relatively significant in image information. For example, when it is difficult to extract a pixel value of a pixel within a corresponding portion of the frame merely from a pixel value of an adjacent pixel, e.g., due the image information within the portion of the frame having different intensities and/or colors, such as when the portion of the frame has a checkered appearance, that portion of the frame may be classified into the feature region. The 'uniform region' may designate portions of the frame where changes may be relatively insignificant in image information. For example, when it is easy to extract the pixel value of the pixel within a corresponding portion of the frame merely from a pixel value of an adjacent pixel, e.g., due to image information of that portion of the frame generally having the same intensities and/or colors, this portion of the frame may be classified into the uniform region. The classifying of portions of the current frame into the feature region and the uniform region will be described in greater detail below. Additionally, as also discussed in greater detail below, pixels within a frame may be selectively classified into one of the feature region and uniform region, such that some of the pixels of the current frame are considered to be within the feature region and some of the pixels of the current frame are considered to be within the uniform region. In one or more embodiments, the pixels classified into the feature region would not be the same pixels classified into the uniform region, and not all pixels of the low definition frame are required to be classified into the feature region or uniform region.

In one or more embodiments, if trajectory information of a previous frame is available, trajectory estimation may be performed within or before operation S110. If trajectory estimation of a pixel of the low definition frame is performed within or before the operation S110, and it is accordingly determined that the pixel is traced by another pixel of the previous frame, any resulting trajectory estimated pixels of the low definition frame may be automatically classified as feature region pixels of the low definition frame. For example, if a first low definition frame of the low definition video is being reviewed, such trajectory information of a previous frame may not be available. However, when the next low definition frame is analyzed the trajectory information for trajectory estimating pixels of the next low definition frame may be available based upon the classification of pixels of the current low definition frame. The remaining pixels of the low definition frame may still be classified into the feature region or uniform region. Similarly, the classification of operation S110 may be only performed on select pixels of the low definition frame, as some pixels surrounding an already classified feature region pixel may selectively not be classified, e.g., based on a potential maintenance of a minimal distance between classified pixels of the feature region. Pixel values for at least some of these surrounding pixels may still be stored, as being adjacent or neighboring pixels of the pixel classified into the feature region. In one or more embodiments, there may be no maintained minimal distance between uniform region classified pixels.

Accordingly, in operation S120, a feature region based high definition frame may be produced based on the feature region. According to one or more embodiments, a corresponding high definition video may then be produced based on a plurality of frames of the low definition video with respect to the feature region.

In operation S130, a uniform region based high definition frame may be produced based on the uniform region. According to one or more embodiments, a corresponding high definition video may be produced using interpolation with respect to pixels of the current frame that are classified as being within the uniform region. That is, the corresponding high definition video may be generated based on each single frame of the low definition video, by itself, with respect to pixels within the uniform region of each frame. Operations S120 and S130 may be performed in parallel.

In operation S140, a high definition video may be produced based on the above described processes S110-130. According to one or more embodiments, high definition videos may be separately produced with respect to each of the classified feature region and the uniform region of each low definition frame, e.g., analyzed to produce respective high definition frames that are combined to generate a feature region based high definition video and a uniform region based high definition video, and then the high definition video based on the feature region and the high definition video based on the uniform region may be combined to produce a single high definition video representing both feature and uniform regions.

The classifying of a current frame into the feature region and the uniform region according to one or more embodiments will now be described in greater detail. Any of the below classification operations, to classify a pixel or block of pixels into a feature region or uniform region, may be performed alone or in combination for classification of pixels or blocks of pixels into at least the feature region and uniform region.

Accordingly, in one or more embodiments, pixels or blocks of a current frame having a relatively high spatial spectrum may be classified into the feature region, and pixels or blocks of the current frame having a relatively low spatial spectrum may be classified into the uniform region.

According to one or more embodiments, respective pixels of the current frame of the low definition frame may be classified into the feature region and/or the uniform region in accordance with respective gradient values of pixels of the current frame. When a gradient value of a pixel meets or is equal to or greater than a reference value, or one or more reference values, the pixel of the current frame may be classified into the feature region, and when the gradient value does not meet or is less than the reference value(s), the pixel of the current frame may be classified into the uniform region. The 'gradient value' may be a rate of change of information about an intensity of the pixel, a color of the pixel, and the like, for example. According to one or more embodiments, the gradient value including a rate of change in an x-axis and a rate of change in a y-axis may be used. For example, the gradient value may be represented as $|G|=|G_x|+|G_y|$, where $|G|$ denotes a gradient value, $|G_x|$ denotes a rate of change in an x-axis, and $|G_y|$ denotes a rate of change in a y-axis. According to one or more embodiments, the gradient value may be determined based on either the rate of change in the x-axis or the rate of change in the y-axis, or both. Though these embodiments describe the gradient with regard to an arbitrary pixel, the gradient may be with regard to a pixel and/or one or more blocks of pixels, e.g., a gradient for a block based upon a calculated gradient for one or more pixels of the block or the block as a whole, such as through an averaging process of the pixels within the block. For example, an intensity of a block of pixels or color of the block of pixels may be based upon an averaging of pixel values within the block, though alternative representations of the block or pixels within blocks may be generated by alternative techniques. To avoid repetition herein for the below described embodiments, the above meaning of a gradient and how a gradient may be calculated are equally intended to be applied to embodiments below that also use the 'gradient' term.

According to one or more embodiments, respective pixels of the current frame of the low definition video may be classified into the feature region and/or the uniform region in accordance with respective second differential values of pixels of the current frame. In an embodiment, when a second differential value of a pixel of the current frame meets or is equal to or greater than a reference value, or one or more reference values, the pixel of the current frame may be classified into the feature region, and when the second differential value does not meet or is less than the reference value(s), the pixel of the current frame may be classified into the uniform region. According to one or more embodiments, the 'second differential value' may be calculated according to a Laplacian technique, Laplacian of Gaussian (LOG) technique, and the like, for example. Similar to above, though these embodiments describe the second differential with regard to an arbitrary pixel, the second differential may be with regard to a pixel and/or one or more blocks of pixels. To avoid repetition herein for the below described embodiments, the above meaning of a second differential and how a second differential may be calculated are equally intended to be applied to embodiments below that also use the 'second differential' term.

According to one or more embodiments, respective pixels of the current frame of the low definition video may be classified into the feature region and/or the uniform region in accordance with a dispersion of an intensity difference between pixels of the current frame and respective adjacent or neighboring pixels.

Herein, the term 'neighboring pixel' may represent one or more pixels that are adjacent, meaning directly adjacent, to a current pixel and pixels that are neighboring the current pixel, e.g., a pixel that is a defined degree of separation from the current pixel. Neighboring pixels are pixels near an arbitrary pixel and separated a defined degree from the arbitrary pixel, with this degree being potentially adjustable, in one or more embodiments. For example, in an embodiment, when the degree is 3 the neighboring pixels may include pixels adjacent to the current pixel and pixels up to pixels 3 degrees away from the current pixel, i.e., pixels separated from the arbitrary pixel by three pixels or less. The degree of separation also is not required to be equal in all directions surrounding the arbitrary pixel. Below, though references will be made to one or more adjacent pixels of a pixel, unless indicated otherwise it should be understood that such embodiments are equally available for greater degrees of separation from one or more neighboring pixels, i.e., each embodiment referencing adjacent pixels is also intended to be available neighboring pixels in addition, or as an alternative, to the adjacent pixels, according to the respective consideration of the one or more adjacent pixels in each embodiment.

Accordingly, when the dispersion of the intensity difference between a pixel of the current frame and an adjacent pixel meets or is equal to or greater than a reference value, or one or more reference values, the pixel of the current frame may be classified into the feature region, and when the dispersion of the intensity difference does not meet or is less than the reference value(s), the pixel of the current frame may be classified into the uniform region. According to one or more embodiments, the 'dispersion of the intensity difference' may designate a difference between the intensity difference of the pixel of the current frame and the adjacent pixel with an average value of the intensity difference, and may be a measure of a dispersion degree of the intensity difference based on the average value. Similar to above, though these embodiments describe the dispersion with regard to an arbitrary pixel and another adjacent or neighboring pixel, the dispersion may be with regard to a pixel and/or one or more blocks of pixels compared to another adjacent or neighboring pixel and/or blocks or pixels. To avoid repetition herein for the below described embodiments, the above meaning of a dispersion and how a dispersion may be calculated are equally intended to be applied to embodiments below that also use the 'dispersion' term.

According to one or more embodiments, pixels or blocks of the current frame of the low definition video may be classified into the feature region and/or the uniform region in accordance with a difference between pixel values of pixels of the current frame and one or more of their respective adjacent pixels. When this difference between the pixel values meets or is equal to or greater than a reference value, or one or more reference values, the corresponding pixel of the current frame may be classified into the feature region, and when the difference between the pixel values does not meet or is less than the reference value, the corresponding pixel of the current frame may be classified into the uniform region. In an embodiment, if multiple adjacent pixels are considered, the difference could be determined with one or more of the adjacent pixels individually or based upon an averaging of information from the adjacent pixels, as only an example. According to one or more embodiments, the 'pixel value' may be information about a color value and an intensity value of the pixel, and the like, for example. Similar to above, though these embodiments describe the difference between pixel values with regard to an arbitrary pixel and at least one other adjacent or neighboring pixel, the difference between pixel values may be with regard to a pixel and/or one or more blocks of pixels compared to another adjacent or neighboring pixel and/or blocks or pixels. To avoid repetition herein, the below described embodiments regarding the meaning of a difference between pixel values, how a difference between pixel value may be calculated, and the term 'pixel value' are equally applied to embodiments below that also use the 'difference between pixel value' term and the 'pixel value' term.

Additionally, in one or more embodiments, based upon a classification of one pixel of a current frame into the feature region there may not be a need to classify the pixels near the classified feature region pixel into either of into the feature region and the uniform region in accordance with the spatial spectrum, i.e., it may not be necessary to perform the classification process on all pixels of the current frame, as the classification process can be bypassed for pixels near the already classified feature region pixels and these bypassed pixels may either be not classified into either of the feature region or uniform region or merely classified into the feature region as only being pixels near the feature region pixel. Regardless, in one or more embodiments, pixel information for at least some of these near pixels may still be stored, e.g., as pixel information of adjacent or neighboring pixels of the classified feature region pixel. This selective classification approach may be performed so that a minimal distance between pixels classified into the feature region (hereinafter, referred to as 'feature region pixels') is maintained. The minimal distance may be equated to or dependent on the above described degree of separation of neighboring pixels, or the minimal distance may directly correspond to the degree of separation of neighboring pixels.

Thus, according to one or more embodiments, an arbitrary pixel may be classified into either of the feature region and/or the uniform region in accordance with the spatial spectrum. Next, when the arbitrary pixel has been classified into the feature region, classification into either of the feature region or uniform region may only need to be subsequently done on a pixel that is separated from the arbitrary pixel by a certain minimal distance, thereby maintaining the minimal distance between the feature region pixels. Rather, when the arbitrary pixel is classified as being included in the uniform region (hereinafter, referred to as 'uniform region pixel'), pixels adjacent to or near the arbitrary pixel may still be classified into either of the feature region and the uniform region, regardless of such a minimal distance. By adjusting the minimal distance, the number of the feature region pixels of the current frame may be adjusted.

According to one or more embodiments, the method may further include receiving an input of the minimal distance, and/or receiving an input of the degree of separation controlling whether pixels are considered neighboring. As only an example, this minimal distance may be based on a distance between feature region pixels designed to prevent overlap of respective trajectories i.e., if the feature region pixels are too close to each other in space, a trajectory estimation from some of these feature region pixels may overlap.

Hereinafter, an adjusting of the classification operation to maintain the minimal distance between the feature region pixels will be further described with reference to FIGS. 2 and 3.

Figure 2:
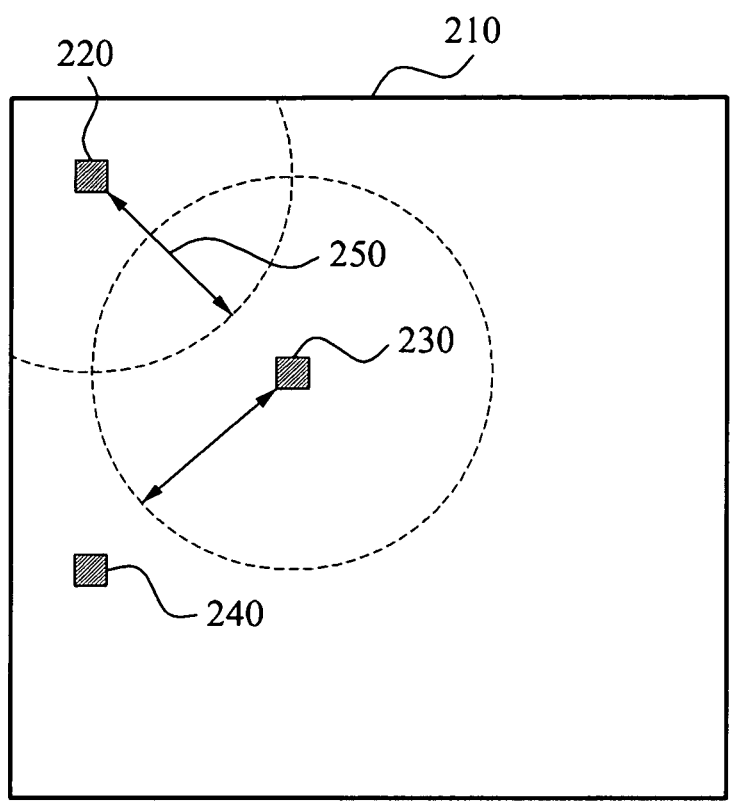
FIG. 2 illustrates an adjustment of a classification operation to maintain a minimal distance between feature region pixels, according to one or more embodiments.

FIG. 2 illustrates an adjustment of the classification operation to maintain a minimal distance between feature region pixels, according to one or more embodiments.

Referring to FIG. 2, in one or more embodiments, an arbitrary pixel 220 of a current frame 210 may be classified into either of a feature region and a uniform region in accordance with a respective spatial spectrum. When the pixel 220 is classified into the uniform region, further classification of pixels adjacent to the pixel 220 into the feature region or uniform region may next be performed to classify each of the adjacent pixels into either of the feature region and the uniform region in accordance with their respective spatial spectrum, i.e., regardless of any minimal distance between uniform region pixels. When the pixel 220 is classified into the feature region, classification into the feature region or uniform region of pixels within a radius of a minimal distance 250 from the pixel 220 may selectively not be performed. Rather, the classification into the feature region or the uniform region being performed for a pixel 230 outside the minimal distance 250. In one or more embodiments, when the pixel 220 is classified to be a feature region pixel, the pixels within the minimal distance 250 may not be classified, though information about the pixels are stored, e.g., as pixels adjacent, neighboring, or near the feature region pixel 220, for subsequent interpolation purposes, for example. As alternative, the pixels within the minimal distance 250 may automatically be classified into the feature region, though differently from the pixel 220. Herein, in one or more embodiment, when such a minimal distance is applied, the term feature region pixel will refer to the pixel from which the minimal distance originates.

Here, again, if the pixel 230 is classified as being one of the feature region pixels, classification of pixel 240 outside a minimal distance radius from the pixel 230 may be performed, while classification may not be performed for pixels within the minimal distance from pixel 230. Accordingly, the classification of pixels may be adjusted or controlled to maintain a minimal distance among the feature region pixels 220, 230, and 240 (e.g., when pixel 240 is classified into the feature region).

Figure 3:
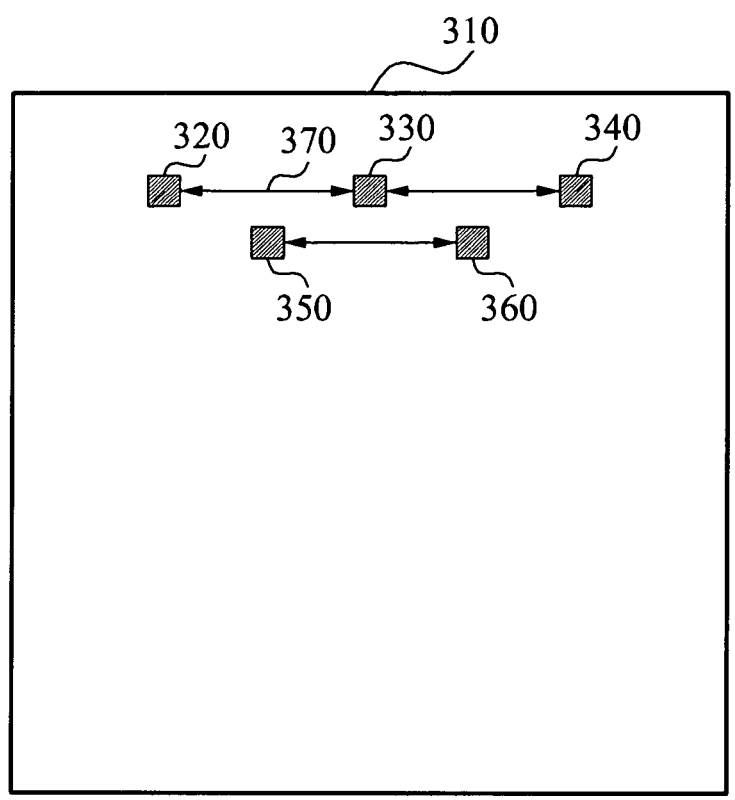
FIG. 3 illustrates an adjustment of a classification operation to also maintain a minimal distance between feature region pixels, according to one or more embodiments.

FIG. 3 illustrates an adjustment of a classification operation to maintain a minimal distance between feature region pixels, according to one or more embodiments.

Referring to FIG. 3, an arbitrary pixel 320 of a current frame 310 of a low definition video may be classified into either of the feature region and the uniform region in accordance with a respective spatial spectrum. When the pixel 320 is classified into the uniform region, classification of pixels adjacent to the pixel 320 may still be performed, regardless of any minimal distance between the uniform region pixels. When the pixel 320 is classified into the feature region, classification may not be performed for pixels separated from the pixel 320 in an x-axis by a minimal distance 370 or less, while classification may be performed for pixel 330 spaced apart from the pixel 320 by at least the minimal distance 370 in the x-axis.

Next, regardless of whether the pixel 330 is classified to be a uniform region pixel or feature region pixel, classification of pixel 340 separated from the pixel 330 in an x-axis by at least the minimal distance may be performed.

According to one or more embodiments of FIG. 3, the minimal distances relied upon to determine whether to perform classification may be adjusted so a classification is performed based only on maintenance of a minimal distance in the x-axis, and a minimal distance in the y-axis may not be controlling on whether to perform classification. Accordingly, when both pixel 320 and pixel 340 are classified to be one of the feature region pixels, since pixel 350 is separated from the pixel 340 by at least a minimal distance in the x-axis, different from the y-axis distance, classification of the pixel 340 may be performed. Similarly, when the pixel 340 is classified to be one of the feature region pixels, if pixel 360 is separated from the pixel 340 by at least the minimal distance in the x-axis, different from the y-axis distance, classification of the pixel 360 into either of the feature region and the uniform region may be performed.

According to one or more embodiments, the minimal distances relied upon to determine whether to perform classification may alternatively be adjusted so a classification is performed based only on maintenance of only one minimal distance in the x-axis or minimal distance in the y-axis, or the minimal distances relied upon to determine whether to perform classification may be based on both at least one minimal distance in the x-axis and at least one minimal distance in the y-axis different from the minimal distance in the y-axis. Similarly, minimal distances may be different for positive or negative directions in the x or y-axes distances, and may be differently adjusted based on the region of the current frame. As only an example, regions of interest may be predetermined so minimal distances may be adjusted to provide greater preference to one area over another.

According to one or more embodiments, pixels, being separated from classified feature region pixels by at least such minimal distances, and also respectively having a relatively high spatial spectrum may accordingly also be classified into the feature region. Accordingly, in one or more embodiments, pixels within a minimal distance from a classified feature region pixel, even though they may respectively have a relatively low spatial spectrum, e.g., typically available for classification into the uniform region, may not be classified into either of the feature region or the uniform region. In one or more embodiments, even though the pixels within the minimal distance may be classifiable into the uniform region, the pixels within the minimal distance are automatically classified into the feature region. A pixel beyond a minimal distance from the feature region pixel and having a relatively low spatial spectrum may still be classified into the uniform region. Hereinafter, pixels being separated from a respective closest classified feature region pixel by at least minimal distances will be defined as a 'separated pixel' or 'separated pixels'.

According to one or more embodiments, separated pixels may be respectively classified into the feature region and the uniform region in accordance with their respective gradient values, as discussed above. In this instance, when the respective gradient values of the separated pixels meet or are equal to or greater than a reference value, or one or more reference values, the separated pixels may be respectively classified into the feature region, and when the respective gradient values of the separated pixels do not meet or are less than the reference value(s), the separated pixels may be classified into the uniform region.

According to one or more embodiments, the separated pixels may be respectively classified into either of the feature region and the uniform region in accordance with second differential values, as discussed above, of the separated pixels. When the second differential values of the separated pixels meets or are equal to or greater than a reference value, or one or more reference values, the separated pixels may be classified into the feature region, and when the second differential values of the separated pixels do not meet or are less than the reference value(s), the separated pixels may be classified into the uniform region.

According to one or more embodiments, the separated pixels may be respectively classified into either of the feature region and the uniform region in accordance with a dispersion of an intensity difference, as discussed above, between the separated pixels and adjacent pixels When a dispersion of an intensity difference, as discussed above, between the separated pixels and the respective adjacent pixels meets or is equal to or greater than a reference value, or one or more reference values, the separated pixels may respectively be classified into the feature region, and when the dispersion of the intensity difference between the separated pixels and the respective adjacent pixels does not meet or is less than the reference value(s), the separated pixels may be respectively classified into the uniform region.

According to one or more embodiments, the separated pixels may be respectively classified into either of the feature region and the uniform region in accordance with a difference of pixel values, as discussed above, between the separated pixels and the respective adjacent pixels. In this instance, when the difference of pixel values meets or is equal to or greater than a reference value, or one or more reference values, the separated pixels may be respectively classified into the feature region, and when the difference of pixel values does not meet or is less than the reference value(s), the separated pixels may be respectively classified into the uniform region.

In one or more embodiments, the current frame may be divided into N×M-numbered blocks, with at least one of N and M being greater than 1. In one or more embodiments, any one pixel from any one block the N×M-numbered blocks may be classified as including a feature region pixel, and based upon comparisons between other classified feature region pixels of the block or based merely based upon the feature region pixel being the first classified feature region pixel of the block, for example, the entire block may be classified into the feature region with at least one of the pixels of the block being classified as being a feature region pixel. For example, one pixel of a feature region block may be classified as the feature region pixel and the remaining pixels of the block may be classified as neighboring pixels of the feature region pixel of the block. Similarly, one pixel of a uniform region block may be classified as the uniform region pixel and the remaining pixels of the block may be classified as neighboring pixels of the uniform region pixel of the block, e.g., such that the uniform region pixel may be used to represent one or more of the pixels of the block during interpolation.

Figure 4:
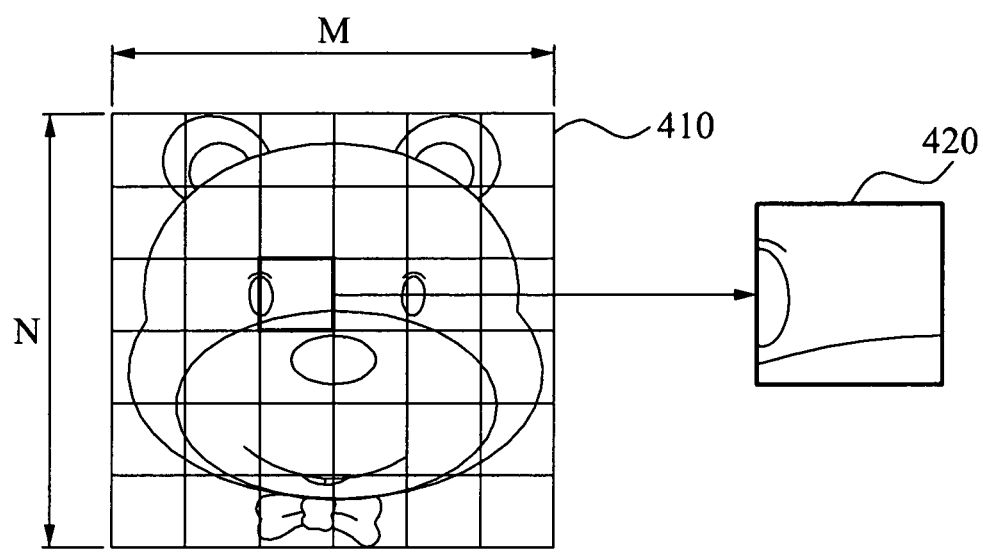
FIG. 4 illustrates a division of a current frame into N×M-numbered blocks to determine feature region pixels, according to one or more embodiments.

FIG. 4 illustrates a division of a current frame 410 into such N×M-numbered blocks to determine feature region pixels, according to one or more embodiments. In one or more embodiments below, if one pixel of a block of the N×M-numbered blocks is classified as a feature region pixel for the block, then the remaining pixels within the block may also be classified into the feature region and potentially all pixels within the block may be identified as adjacent or neighboring pixels of the feature region pixel of the block. Similarly, if no pixel within the block meets one or more, or all, of the aforementioned classification operation requirements, then the entire block may be classification into the uniform region.

Referring to FIG. 4, a method of producing high definition video from low definition video according to one or more embodiments may include dividing the current frame 410 into M blocks along an x-axis, and into N blocks along a y-axis. With respect to all pixels within a block 420, from among the N×M-numbered blocks, a gradient value may be estimated. When a pixel having the greatest gradient value within the block 420 has a gradient value that meets or is equal to or greater than a reference value, or one or more reference values, the pixel may be classified to be a feature region pixel. When the pixel having the greatest gradient value within the block 420 has a gradient value that does not meet or is less than the reference value(s), the pixel may be classified to be a uniform region pixel. Here, in one or more embodiments, additional pixels of the block may be classified as being feature region pixels based upon their gradient value and/or proximity within the block relative to the pixel having the greatest gradient value. By adjusting a magnitude of either N or M, the potential number of feature region pixels classified in the current frame may be controlled.

According to one or more embodiments, a reference value may be input and received for classifying a pixel, having the greatest gradient value within a corresponding block, into either of the feature region pixel and the uniform region pixel.

In one or more embodiments, a pixel having the greatest spatial spectrum within a block, e.g., of the N×M-numbered blocks, and a spatial spectrum meeting or being equal to or greater than a reference value, or one or more reference values, may be classified as being one of the feature region pixels. When the pixel having the greatest spatial spectrum within the block has a spatial spectrum that does not meet or is less than the reference value(s), all pixels within the block may be classified into the uniform region. Here, in one or more embodiments, additional pixels of the block may be classified as being feature region pixels based upon their respective spatial spectrum and/or proximity within the block relative to the pixel having the greatest spatial spectrum.

According to one or more embodiments, a pixel, having the greatest second differential value, as discussed above, within a block, e.g., of the N×M-numbered blocks, and having a second differential value meeting or being equal or greater than a reference value, or one or more reference values, may be classified to be one of the feature region pixels. When the pixel having the greatest second differential value within the block has a second differential value that does not meet or is less than the reference value(s), all pixels within the block may be classified into the uniform region. Here, in one or more embodiments, additional pixels of the block may be classified as being feature region pixels based upon their respective second differential value and/or proximity within the block relative to the pixel having the greatest second differential value According to one or more embodiments, a pixel having the greatest dispersion of an intensity difference, as discussed above, with a respective adjacent pixel within a block, e.g., of the N×M-numbered blocks, and having a dispersion of the intensity difference meeting or equal to or greater than a reference value, or one or more reference values, may be classified as being one of the feature region pixels. When the pixel having the greatest dispersion of the intensity difference with a respective adjacent pixel within the block has a dispersion of the intensity difference that does not meet or is less than the reference value(s), all pixels within the block may be classified into the uniform region. Here, in one or more embodiments, additional pixels of the block may be classified as being feature region pixels based upon their dispersion and/or proximity within the block relative to the pixel having the dispersion.

According to one or more embodiments, a pixel having the greatest difference between pixel values with a respective adjacent pixel within a block, e.g., of the N×M-numbered blocks, and having a difference of the pixel values meeting or equal to or greater than a reference value, or one or more reference values, may be classified to be one of the feature region pixels. When the pixel having the greatest difference between the pixel values with a respective adjacent pixel within the block has a difference between the pixel values that does not meet or is less than the reference value(s), all pixels within the block may be classified into the uniform region. Here, in one or more embodiments, additional pixels of the block may be classified as being feature region pixels based upon their respective difference between pixel values and/or proximity within the block relative to the pixel having the greatest difference between pixel values.

Figure 5:
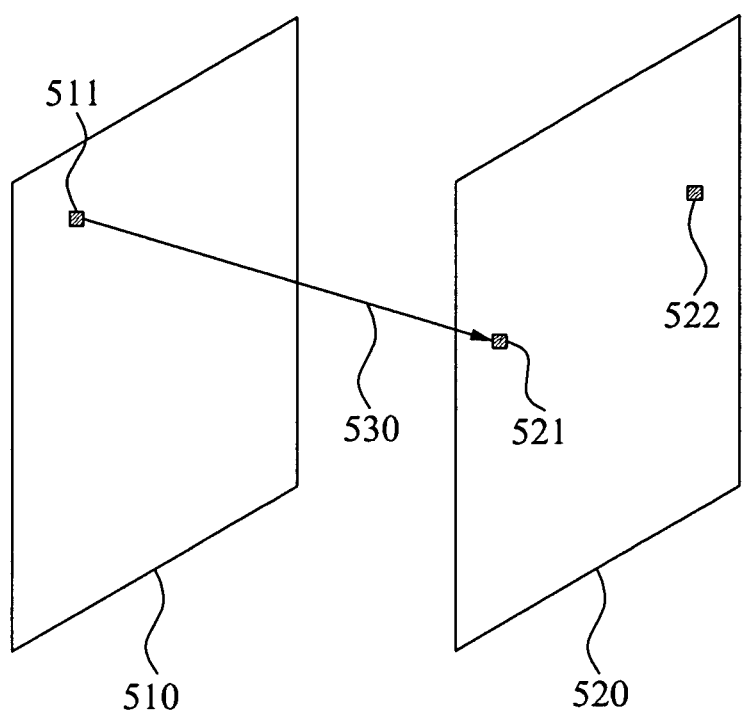
FIG. 5 illustrates classifying portions of a current frame into one of a feature region and a uniform region, according to one or more embodiments.

FIG. 5 illustrates classifying portions of a current frame into one of a feature region and a uniform region, according to one or more embodiments. In one or more embodiments, the portions of a frame may be pixels or blocks of pixels, and all pixels of blocks of pixels of the frame may be classified into the feature region and uniform region. Alternatively, in one or more embodiments, some pixels within the blocks may not be classified if a minimal distance is not met, as only an example.

Referring to FIG. 5, the pixel 511 is a previously classified feature region pixel in a previous frame 510, and the pixel 521 and the pixel 522 may be to-be-classified pixels of a current frame 520. Based upon stored information, e.g., in a registration memory, the pixel 521 may be determined to be corresponding to pixel 511 based on trajectory estimation 530 of pixel 511. As pixel 511 of the previous frame 510 was a feature region pixel, the pixel 521 may similarly be classified as a feature region pixel for the current frame 520, i.e., without requiring classification. The pixel 521 may be considered to have been traced by the trajectory estimation 530. However, without such an indication of a trajectory tracing of a feature region pixel in the previous frame 510, classification may still need to be performed for the pixel 522, with the pixel 522 being classified into one of the feature region and the uniform region in accordance with the spatial spectrum of pixel 522. Information of each pixel that is classified as a feature region pixel may be stored in the aforementioned registration memory, with information of the adjacent or neighboring pixels and pixels within a minimal spacing of the classified feature region pixel.

According to one or more embodiments, trajectory estimation may be performed only from feature region pixels of the previous frame to pixels of the feature region of a current frame. Trajectory estimation may be performed prior to classification of pixels of the current frame into the feature region and the uniform region, in which case a pixel of the current frame that is trajectory estimated based upon a feature region pixel of a previous frame may be automatically classified into the feature region, and further classified as a feature region pixels of the feature region. Thus, classification of the trajectory estimated pixel would not be performed, as the trajectory estimated pixel would have already been classified into the feature region.

That is, there may be no trajectory estimation from a pixel classified into the uniform region of the previous frame to a pixel of the current frame. Rather, a high definition video corresponding to the uniform region of the current frame may be separately produced based upon pixels of only the uniform region using interpolation adopting information about only the current frame, for example. Accordingly, in one or more embodiments, interpolation of the uniform region and/or uniform region pixels of the current frame may be performed using a single frame, e.g., the current frame. The 'trajectory estimation' may be reserved for pixels of the current frame and feature region pixels of a previous frame. Accordingly, it may only be necessary to store pixel values and locations of the feature region pixels, and respective adjacent or neighboring pixels, for previous frames. If the feature region pixel of the previous frame is also a trajectory estimated feature region pixel, i.e., it was estimated from a feature region pixel of a further previous frame, then trajectory information may also be stored, identifying the feature region pixel of the further previous frame. Accordingly, by performing trajectory estimation from this feature region pixel in the previous frame to a pixel in the current frame, the pixel of the current frame may be trajectory estimated and the pixel information for at least two previous feature region pixels corresponding to the trajectory estimated pixel may be known. For example, FIG. 9 illustrates three previous frames of the same lineage.

The trajectory estimation may include designating a select pixel of one frame (e.g., a current frame) having a highest correlation with a feature region pixel of another frame (e.g., previous frame). This correlation between respective pixels of a previous frame and pixels of a current frame may be based on information including an intensity value, a gradient value, a second differential value, a spatial spectrum value, and a pixel value of a pixel, and the like, for example based upon the above discussions of the same terms. For example, according to one or more embodiments, a sum of absolute difference (SAM) method of performing the trajectory estimation using an intensity difference may be used, for example. In one or more embodiments, the trajectory estimation may identify the most probable pixel coordinates of the current frame for a feature region pixel of a previous frame based on the trajectory estimation, and then correlation may be performed to further identify the most appropriate pixel from the probably pixel coordinates, e.g., candidate coordinates, corresponding of the current frame for the feature region pixel of the previous frame.

In a case where there is a detected transition, occlusion, and the like, any results of a trajectory estimation with respect to a pixel of the current frame corresponding to a feature region pixel of the previous frame may not be stored in the registration memory, or at least interpolation of the corresponding high definition frame corresponding to the current frame would not be based upon this trajectory estimation. Due to the transition, occlusion, and the like, if the corresponding trajectory estimation results were used within the interpolation of pixels of the high definition frame there may be a greater probability of an erroneous interpolation. In an embodiment, the trajectory estimation may fail to be performed with respect to the pixel of the current frame corresponding to the feature region pixel of the previous frame when there is a detected transition, occlusion, and the like. Accordingly, here, as the trajectory estimation has not been performed, the registration memory would also not be updated with the information of the correspondence between the feature region pixel of the previous frame and the current pixel. When the trajectory estimation results are not stored or the trajectory estimation fails to be performed for a particular pixel of the current frame, pixels excluding the particular pixel of the current frame, on which the trajectory estimation having been performed, corresponding to the feature region pixel of the previous frame, may be classified into the feature region and the uniform region in accordance with their respective spatial spectrum. If the current frame has been divided into the N×M-numbered blocks, then another pixel, of the same block as the particular pixel for which trajectory estimation has been decided not appropriate, e.g., because of the transition, occlusion, or the like, may be classified into the feature region based upon the spatial spectrum and/or estimated trajectory from the feature region pixel of the previous frame. As noted above, in one or more embodiments, this other feature region pixel may then be considered the feature region pixel for all pixels of the block.

Figure 6A:
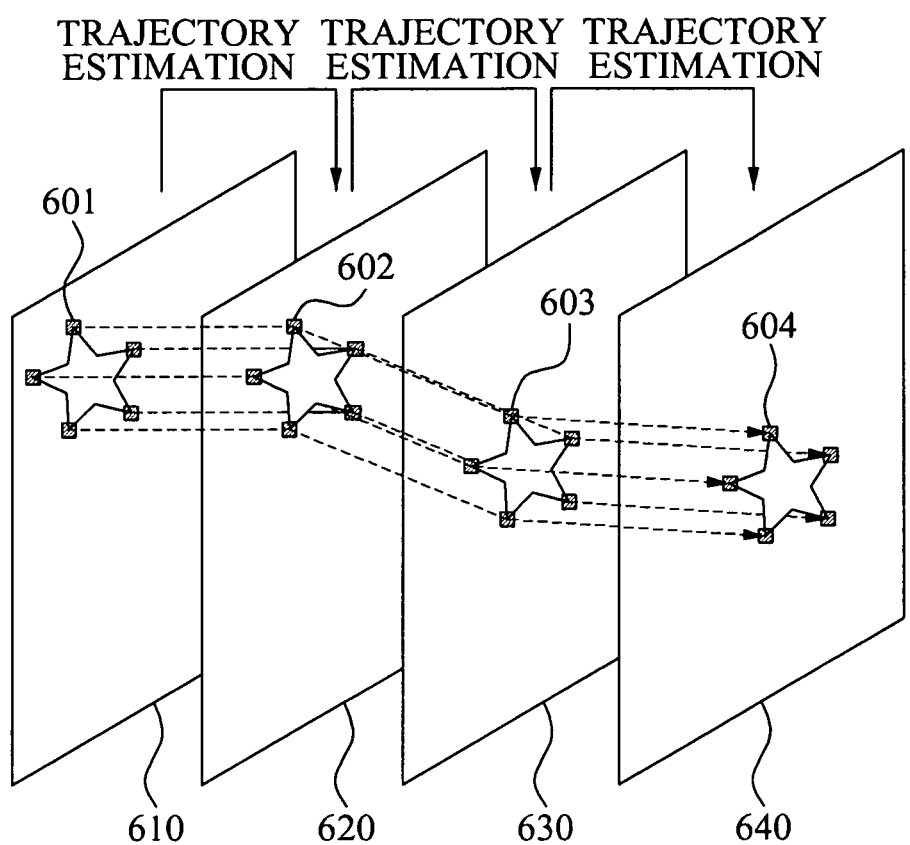
FIGS. 6A-6B illustrate trajectory estimation being performed on feature region pixels, according to one or more embodiments.

FIGS. 6A and 5B illustrate trajectory estimation being performed on feature region pixels, according to one or more embodiments.

Figure 6B:
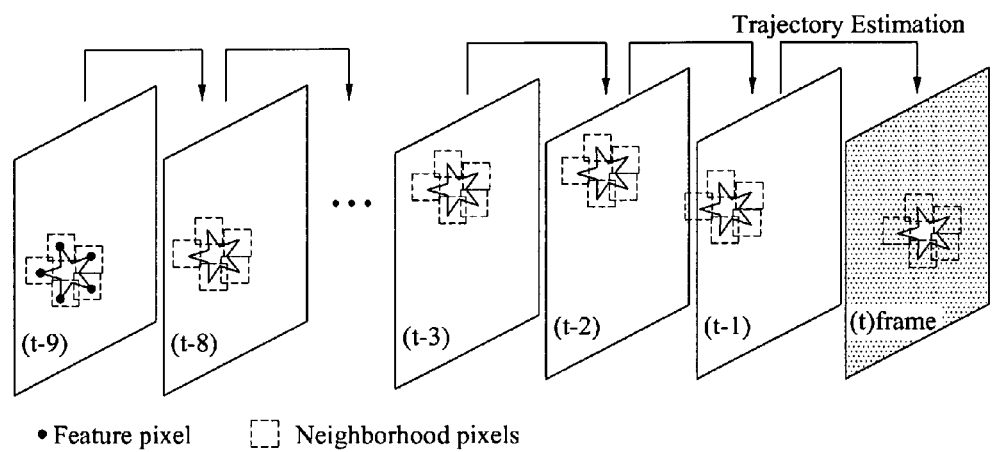

Referring to FIGS. 6A and 6B, in one or more embodiments, trajectory estimation to a pixel of a current frame 640 from a feature region pixel 601 of a previous frame 610, for example, may be performed. In one or more embodiments, the trajectory estimation of a pixel of the current frame 640 may be based only on feature region pixels of the previous frame 630, or only feature region pixels of previous frames. Briefly only an example, the current frame 640 may be considered frame(t) at time t, the previous frame 630 may be considered frame(t-1), frame 620 may be considered frame (t-2), frame 610 may be considered frame(t-3), as similarly shown in FIG. 6B. Accordingly, if the trajectory estimation based on 10 frames is considered, for example as shown in FIG. 6B, an estimation of a pixel for frame(t) can ultimately be based on the estimation of a pixel for a frame(t-8) from a trajectory estimation of a feature region pixel in frame (t-9), . . . , estimation of a pixel of frame(t-2) based on a trajectory estimation of a feature region pixel in frame(t-3), estimation for a pixel of frame(t-1) based on a trajectory estimation of a feature region pixel in frame(t-2), and estimation for the pixel of frame(t) based on a trajectory estimation of a feature region pixel in frame(t-1). As the information of the feature region pixel of a previous frame, from which a subsequent frame's feature region pixel was trajectory estimated, is known, pixel information from a lineage of related feature region pixels through several frames may be available, e.g., after the below discussed matching operation, for either direct projection into a high definition frame or available for interpolation pixels in the high definition frame.

Using a sub-pixel analysis, in one or more embodiments, and referring to FIG. 6A as an example, a feature region pixel 601 selected in frame 610 may trace to a corresponding feature region pixel 602 in frame 620, e.g., potentially to a sub-pixel unit location in frame 620, the estimated feature region pixel 602 in frame 620 may trace to a corresponding feature region pixel 603 in frame 630 in a sub-pixel unit, and the estimated feature region pixel 603 may trace to a corresponding feature region pixel 604 in frame 640 in a sub-pixel unit. Selection of the traced to feature region pixel in the frame 640 may be performed by selecting a pixel of frame 640 having a greatest correlation from among several candidate pixels in frame 640, based on the trajectory of pixel 603 in frame 630, e.g., with the pixel 604 being selected as having the greatest correlation from among the several candidate pixels in frame 640, for example. Accordingly, in such embodiments, trajectory estimation for pixels of the current frame 640 may be performed only with respect to the feature region pixels 601, 602, and 603 of the previous frames 610, 620, and 630, and trajectory estimation may not need to be performed with respect to the remaining pixels of the previous frames 610, 620, and 630, such as the uniform region pixels.

As will be discussed in greater detail below, according to one or more embodiments, using respective trajectory information of a feature region pixel as traced for each frame, e.g., through a lineage or related feature region pixels, respective registration operations may be performed to store information on a pixel value and location of the trajectory estimated feature region pixel, e.g., in the registration memory, and potentially similar registration of pixel values and locations of corresponding adjacent or neighboring pixels, and information of the feature region pixel from the previous frame from which the trajectory estimated pixel was estimated.

For example, referring to FIG. 6B, positions of pixels adjacent to each feature region pixel of each of the frame(t-9) through frame(t-1) are illustrated. For each of the frames, in addition to the respective feature region pixels, positions of adjacent pixels, and a number of used neighboring pixels, may vary based on accuracy of the registration operation, a complexity of a system, and the like.

In one or more embodiment, in the aforementioned trajectory estimation based on feature region pixels from previous frames, for the previous frames only information of the respective feature region pixel and values of the corresponding adjacent pixels from each previous frame may need to be stored, compared to the aforementioned conventional image processing techniques which require information of all pixels or blocks of each frame to be stored in a separate frame memory, i.e., with information of each frame being stored in a separate frame memory, and trajectory estimation being required for all pixels or blocks from each previous frame. Further, as also noted above, in the conventional image processing techniques, any frame registration of a current frame is only performed after all movement estimations, which are required to be the same as the number of reference frames, e.g., 10 estimations for each movement estimated pixel or block of a current frame, resulting in a real-time processing not being typically available. Conversely, in one or more embodiments, limited pixel information from previous frames and only a trajectory estimation from each feature region pixel may need to have been stored for trajectory estimation pixels of the current frame. Further, in one or more embodiment, any of the previous trajectories for a corresponding feature region pixel may be updated each frame, such that trajectory estimation based on each of the feature region pixels of each of the previous frames can be performed in a real-time manner. Accordingly, in one or more embodiments, the trajectory estimation and interpolation of feature region pixels of the feature region, the interpolation of the uniform region, and the merging of the results of both interpolations are done in real-time.

Motion estimation would conventionally need to be performed on stored information of every pixel or block of a previous frame to trace motion-estimated pixels into a current frame, and the motion estimation would have to be performed for every previous frame that would be relied upon for generating the high definition frame. However, herein, the information for previous related feature region pixels from previous frames, i.e., each trajectory estimating a feature region pixel in a subsequent frame, may be accessible for interpolation without the multiple levels of movement estimation for each of the available previous frame. Rather, by accessing the information of the feature region pixel of the previous frame for trajectory estimated pixel of a current frame, the pixel information for an entire lineage of feature region pixels may be available, e.g., from the registration memory. Accordingly, in one or more embodiments, substantially less memory may be required to store information of only feature region pixels of each previous frame, and potentially corresponding adjacent or neighboring pixels, and respective updated trajectory information of feature region pixels of previous frames frame, such that real-time processing can be performed.

Figure 7:
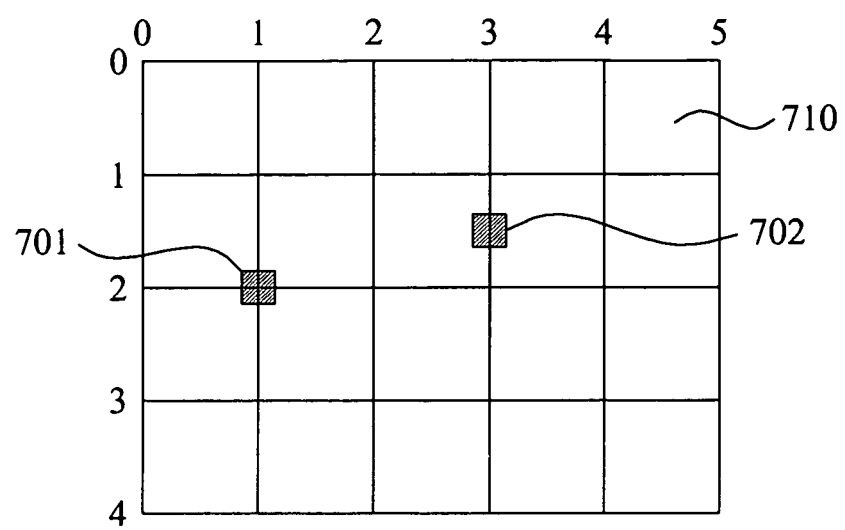
FIG. 7 illustrates trajectory estimation being performed on feature region pixels at a sub-pixel unit, according to one or more embodiments.

FIG. 7 illustrates trajectory estimation being performed on feature region pixels at a sub-pixel unit, according to one or more embodiments.

Referring to FIG. 7, according to one or more embodiments, a pixel 701 of a current frame 710 may be classified as a feature region pixel based on pixel 701 resulting from trajectory estimation performed from a feature region pixel of a previous frame of the current frame 710, and a sub-pixel 702 of the current frame 710 may also be classified as a feature region pixel based on pixel 702 also resulting from trajectory estimation with respect to the feature region pixel of the previous frame of the current frame 710 up to a sub-pixel unit, e.g., the estimated pixel of the current frame may be a sub-pixel of the current frame, i.e., located at a sub-pixel location between existing pixels of the current frame. Here, according to one or more embodiments, the determining of the feature region pixel of the current frame by performing the trajectory estimation with respect to the feature region pixel of the previous frame may include performing trajectory estimation up to the sub-pixel unit level. Information including an intensity value, a gradient value, a second differential value, a spatial spectrum value, and a pixel value of the sub-pixel 702 may be determined based on interpolation from an adjacent pixel, for example. According to one or more embodiments, the information including the intensity value, the gradient value, the second differential value, the spatial spectrum value, and the pixel value of the sub-pixel may be interpolated by an integer unit to be determined.

Figure 8:
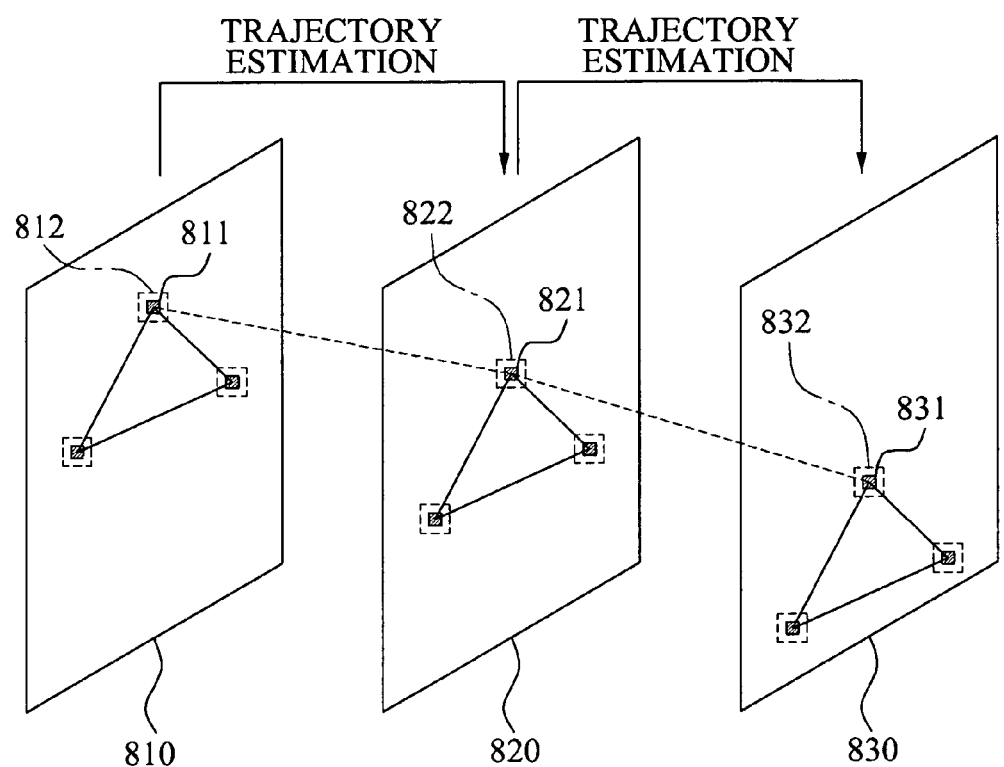
FIG. 8 illustrates feature region pixels of frames of a low definition video, and pixel values and locations of adjacent or neighboring pixels, to be stored, according to one or more embodiments.

FIG. 8 illustrates feature region pixels of frames of a low definition video, and pixel values and locations of adjacent pixels, to be stored, according to one or more embodiments.

Referring to FIG. 8, according to one or more embodiments, trajectory estimation may be performed for a pixel of a current frame 830 based on a feature region pixel 811 of a previous frame 810, e.g., a frame(t-2) or prior to two frames of the current frame 830. A pixel value and location of the pixel 811, as a feature region pixel of the previous frame 810, may be stored, e.g., in the aforementioned registration memory. As discussed above, the 'pixel value' of the feature region pixel may be information including an intensity value, a gradient value, a second differential value, a spatial spectrum value, and a pixel value of the feature region pixel, and the like. Here, the 'location' of the feature region pixel may designate a location of the feature region pixel in a frame of the low definition video, and according to one or more embodiments, may be represented as coordinates, a vector, and the like.

In addition, pixel values and locations of adjacent pixels 812 of the feature region pixel 811, may also be stored, e.g., in the registration memory. The location of the adjacent (or neighboring) pixels may equally be represented as coordinates or a vector, each having a relative value with respect to the location of the feature region pixel (e.g., coordinates having a relative value based on the feature region pixel, or a vector represented as a distance and angle from the feature region pixel), and also represented as coordinates, a vector, and the like, each having an absolute value (e.g., coordinates based on zero, or a vector represented as a distance or angle from zero). As discussed above, the number of neighboring pixels may be adjusted based on matching accuracy and complexity of a system. For determining the adjacent or neighboring pixels, when the feature region pixel is a pixel of a sub-pixel unit, coordinates may be computed using a rounding-down operation, and the adjacent or neighboring pixels may be determined based on the computed coordinates. For example, in a case of the feature region pixel having coordinates (2, 2.5), coordinates (2, 2) may be obtained using the rounding-down operation, and pixels adjacent or neighboring the coordinates (2, 2) may be determined as the adjacent or neighboring pixel. According to one or more embodiments, the coordinates may also be computed using a rounding-up operation, or alternative operation.

The pixel value and location of the feature region pixel 821 of a previous frame 820, e.g., frame(t-1) or prior to one frame, of a current frame 830 of the low definition video, may equally be stored and pixel values and locations of an adjacent or neighboring pixels 822 of the pixel 821 may also be stored. Similarly, a pixel value and location of the classified feature region pixel 831 of the current frame 830, and a pixel values and locations of adjacent or neighboring pixels 832 of the pixel 831 may also be stored, e.g., in the registration memory.

Thus, in one or more embodiments, trajectory estimated feature region pixels of a low definition frame, such as current frame 830, may merely represent the storing in such a registration memory of which feature region pixels, and corresponding adjacent or neighboring pixels, for example, from one or more previous frames would or should correspond to pixels of the feature region in the low definition frame. As noted below, a matching operation may then proceed through these indicated feature region pixels from the previous frames based on their information being stored in the registration memory, by more particularly matching pixels of the low definition frame with the indicated feature region pixels to actually generate the appropriate pixel values and transform the coordinates of the indicated feature region pixels for projection to a high definition frame, with feature region pixel information of the low definition frame also available for projection to the high definition frame. Accordingly, based upon the trajectory estimation and corresponding matching, there may be significantly more pixels and pixel information available for interpolating any one area of the high definition frame. The matching may also identify the pixel value of high definition frame directly from one of the feature region pixels of the current frame or corresponding previous frames. Conversely, in one or more embodiments, the interpolation of the uniform region of the low definition frame may only be based on pixels within the uniform region, and thus the number of pixels from which the interpolation can extrapolate a pixel value from is limited.

Hereinafter, the matching of a feature region pixel of a current frame and a feature region pixel of a previous frame will be further described.

FIG. 9 illustrates matching feature region pixels, according to one or more embodiments.

Referring to FIG. 9, subsequent to the trajectory estimation, for example, in one or more embodiments, a trajectory estimated feature region pixel 941 of a current frame 940 may be matched to feature region pixels 911, 921, and 931 of at least one of previous frames 910, 920, and 930 corresponding to the feature region pixel 941 of the current frame 940, to thereby determine which pixel values from the previous feature region pixels, and corresponding adjacent or neighboring pixels, should be used for interpolating pixels of the high definition video corresponding to the current frame 940. Thus, after the trajectory estimation, if a feature region pixel 911 is still found to adequately match the feature region pixel 941, the pixel values of the feature region pixel 911 and corresponding adjacent or neighboring pixels from frame 910 may be directly projected into the high definition frame and/ or used during the interpolation of pixels of the high definition frame.

Thus, according to one or more embodiments, a pixel value and location of the pixel 911 of the feature region pixel and a pixel value and location of adjacent pixels 912 (illustrated as diamonds) adjacent to the pixel 911, with respect to a previous frame 910, e.g., a frame(t-3) or prior to three frames of the current frame 940, may have been stored, e.g., in the registration memory. Trajectory estimation may have been performed from a pixel of the previous frame 920, e.g., a frame (t-2) or prior to two frames of the current frame 940, to the feature region pixel 911 of the previous frame 910, and a pixel value and location of the feature region pixel 921 of the previous frame 920 and a pixel value and location of adjacent pixels 922 (illustrated as triangles) adjacent to the feature region pixel 921 may have been stored. Trajectory estimation, from a pixel of the previous frame 930, e.g., a frame(t-1) or prior to one frame of the current frame 940, to the feature region pixel 921 of the previous frame 920 may have been performed, and a pixel value and location of the estimated feature region pixel 931 of the previous frame 930 and a pixel value and location of adjacent pixels 932 (illustrated as squares) adjacent to the feature region pixel 931, may have been stored. Trajectory estimation, to a pixel of the current frame 940, from the feature region pixel 931 of the previous frame 930, may further be performed, and a pixel value and location of the estimated feature region pixel 941 and a pixel value and location of adjacent pixels adjacent to the feature region pixel 941 may be stored.

In one or more embodiments plural frames of the low definition video may be input and trajectory estimation may not be performed until a predetermined number of frames have been input to the image processing system. For example, classification may still be performed on each low definition frame in real-time, but not until a sufficient number of frames have been input is the trajectory estimation performed and corresponding results stored. As only an example, a first input frame may only be classified into the feature region and uniform region, and trajectory estimation would not be performed for the first input frame. Trajectory estimation and registration of the trajectory estimated pixels, and corresponding adjacent or neighboring pixels, may rather begin with the second input frame. The first trajectory estimation and registration of trajectory estimated pixels may similarly be performed at a later frame, and may further be performed for previous frames, e.g., if the predetermined number is 4, then four frames may be input and sequentially classified into the uniform region or feature region and upon input of the fourth frame trajectory estimation for the second through third input frames may be performed, e.g., in parallel with the classification of the currently input frame 4.

Figure 13A:
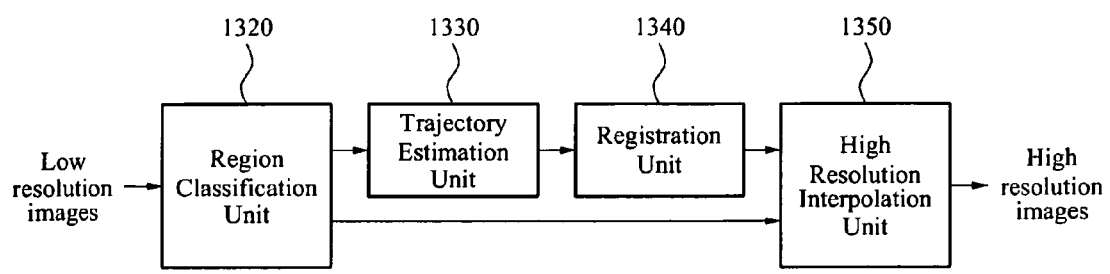
FIGS. 13A-13C illustrate image processing systems producing a high definition image from a low definition image, according to one or more embodiments.
Figure 13B:
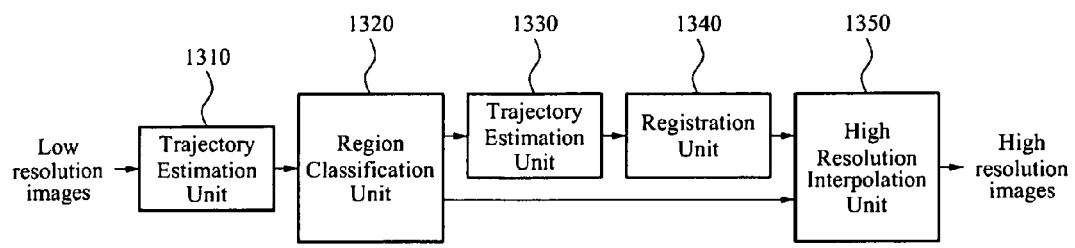
Figure 13C:
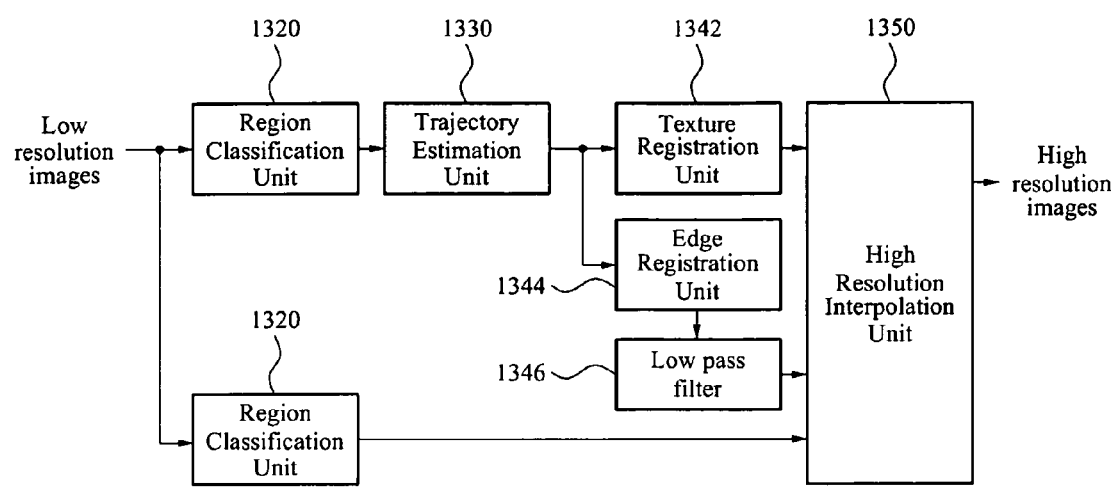
Figure 14:
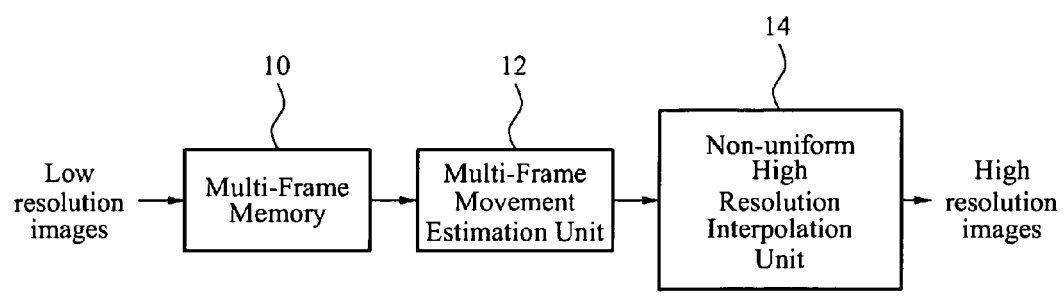
FIG. 14 illustrates a conventional image processing system for producing high definition video.

Accordingly, in the current frame 940, information about pixel values and locations with respect to the feature region pixels 911, 921, and 931 of the previous frames 910, 920, and 930 and the adjacent pixels 912, 922, 932, as well as pixel values and locations with respect to the feature region pixel 941 of the current frame 940 may be available, e.g., from the registration memory, such that the respective previous adjacent pixels 912, 922, 932 could be projected onto the current frame 940, or directly accessed from the registration memory by an interpolation unit, such as the high resolution interpolation unit 1350 of FIGS. 13A-13C. Thus, using this information about the pixel values and locations, a pixel value of each pixel of a frame of the high definition video corresponding to the current frame 940 may be determined to thereby produce the high definition video.

According to one or more embodiments, as shown in FIG. 9, the feature region pixel 911 of the previous frame 910 may have coordinates (2, 2), and the adjacent pixel 912 may have relative coordinates (−1, 1) with respect to the feature region pixel 911. The feature region pixel 921 of the previous frame 920 may have coordinates (2, 2.5), and the adjacent pixel 922 may have relative coordinates (−1, 0.5) with respect to the feature region pixel 921. Also, the feature region pixel 931 of the previous frame 930 may have coordinates (5.5, 1.5), and the adjacent pixel 932 may have relative coordinates (−0.5, −1.5) with respect to the feature region pixel 931. In this instance, locations and pixel values of the adjacent pixels 912, 922, and 932 may be stored. The feature region pixel 941 on which a trajectory estimation having been performed in the current frame 940 may have coordinates (4.5, 2).

According to one or more embodiments, the feature region pixel 941 of the current frame 940 may be matched with the feature region pixels 911, 921, and 931 of the previous frames 910, 920, and 930, and potentially with the adjacent pixels 912, 922, and 932. Using the stored location information indicating the adjacent pixel 912 is located at relative coordinates (−1, 1) with respect to the feature region pixel 911, an adjacent pixel 942 of the current frame 940 may be located at relative coordinates (−1, 1) with respect to the feature region pixel 941 of the current frame 940, and thereby the adjacent pixel 942 may be determined to have coordinates (3.5, 3). Similarly, a feature region pixel 943 of the current frame 940 may be determined to have coordinates (3.5, 2.5), and a feature region pixel 944 of the current frame 940 may be determined to have coordinates (4, 0.5). The updated pixel coordinates for the feature region pixels 911, 921, and 931 from the previous frames 910, 920, and 930, and corresponding adjacent pixels 912, 922, and 932, may also be stored in the registration memory. Here, in one or more embodiments, based upon all coordinates of the feature region pixels being relative to the current frame 640, if a next low definition frame is input, and the trajectory estimation and interpolation described above is applied, potentially only the registration information of the previous frame, i.e., the current frame 640, and updated respective trajectory information for the feature region pixels of the previous frames, may need to be reviewed to interpolate the next low definition frame into a high definition frame.

Through the above described manner, the current frame 940 of the low definition video may have a plurality of pixel values and locations of adjacent pixels estimated with respect to the feature region pixel 941, based on select pixel values and locations from previous frames, and may produce an accurate high definition frame using the plurality of pixel values and locations of the adjacent pixels.

According to one or more embodiments, the aforementioned matching operation may selectively be performed only when a difference of a pixel value between a feature region pixel of a previous frame and a feature region pixel of a current frame on which a trajectory estimation having been performed fails to meet or is less than a reference value, or one or more reference values. In this instance, when the difference is significantly great, there may be no correlation between the feature region pixel of the preceding frame and the feature region pixel of the current frame, and the feature region pixel of the current frame may be unsuitable to be used for producing the high definition video corresponding to the current frame. That is, in one or more embodiments, only when the difference of the pixel value therebetween fails to meet or is less than the reference value, may the matching operation be performed, e.g., to prevent errors of the matching operation with respect to the feature region pixel.

For example, when a difference between a pixel value (e.g., intensity value) of the feature region pixel 921 of the previous frame 920 and a pixel value of the feature region pixel 941 of the current frame 940 is more than the reference value, it may be determined that there is no correlation between the feature region pixel 921 and the feature region pixel 941, and information about the feature region pixel 921 and the adjacent pixel 922 may be excluded when performing the matching operation, and as information used for producing the high definition video corresponding to the current frame 940. Here, a high definition frame may still be produced based on the remaining feature region pixels and respective adjacent pixels of the previous frame 920. The non-matching of the feature region pixel 921 and adjacent pixel 922 may be represented in the registration memory, either as an indication that the information of feature region pixel 921 and adjacent pixel 922 should not be used in the interpolation operation or the information of the feature region pixel 921 and adjacent pixel 922 may merely not be stored at all in a corresponding portion of the registration memory identifying which feature region pixels and corresponding adjacent pixels or neighboring pixels can be utilized during the interpolation process.

According to one or more embodiments, the method may further include receiving an input of one or more reference values for determining the required correlation between feature region pixels of the current frame and respective feature region pixels of the previous frames for this matching operation.

Figure 10:
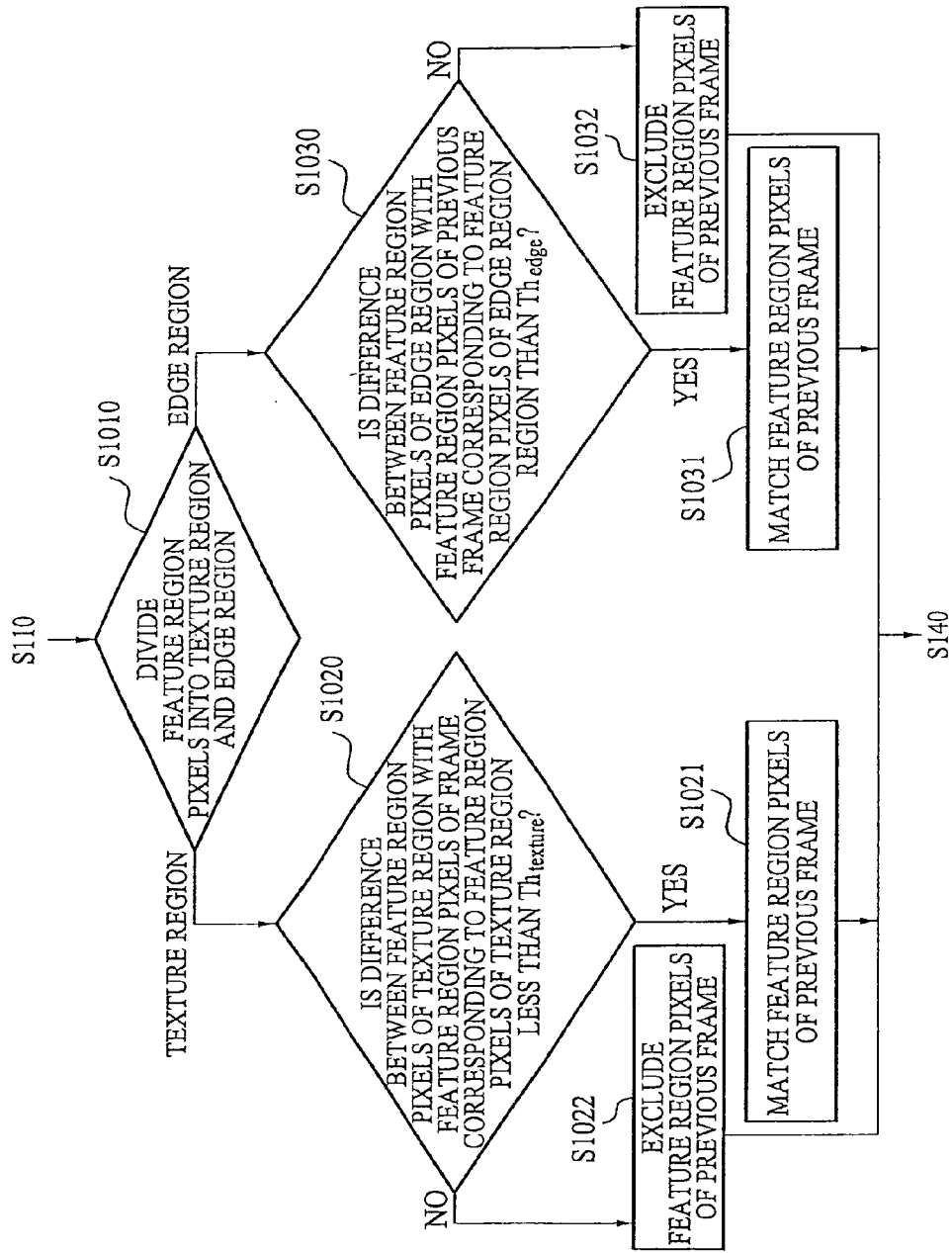
FIG. 10 illustrates a method of preventing errors from occurring in a matching of feature region pixels, according to one or more embodiments.

FIG. 10 illustrates a method of preventing errors from occurring in a matching of feature region pixels, according to one or more embodiments.

Referring to FIG. 10, in operation S1010, according to one or more embodiments, a feature region pixel of a current frame may be further classified into a texture region and an edge region.

According to one or more embodiments, the below discussed reference values $Th_{texture}$ and $Th_{edge}$ may be differently determined depending on whether the feature region pixel of the current frame is respectively included in either the texture region or the edge region. Errors of the matching operation may not be easily recognized when the feature region pixel is included in the texture region, whereas deterioration in image quality may be easily recognized due to the errors of the matching operation in a boundary when the feature region pixel is included in the edge region. Accordingly, in one or more embodiments, reference value $Th_{texture}$ may be used to correct or prevent the errors of the matching operation in the texture region, and $Th_{edge}$ may be used to correct or prevent the errors of the matching operation in the edge region. In one or more embodiments, the $Th_{texture}$ and $Th_{edge}$ reference values may be reference values of brightness values of registration error of the texture region and the edge region, respectively. Generally, in one or more embodiments, $Th_{texture}$ may be determined to be higher than $Th_{edge}$.

Accordingly, when the feature region pixel of the current frame is classified into the texture region, in operation S1020, there may be a determining of whether a difference between a pixel value between the feature region pixel of the texture region and a feature region pixel of a previous frame corresponding to the feature region pixel is less than the reference value of $Th_{texture}$, for example. When the difference of the pixel value therebetween is less than $Th_{texture}$, in operation S1021, the above discussed matching operation may be performed between the feature region pixel of the texture region and the feature region pixel of the previous frame. However, when the difference of the pixel value therebetween exceeds $Th_{texture}$, in operation S1022, the feature region pixel of the previous frame may be excluded when performing the aforementioned matching operation, and similar to above, information regarding the feature region pixel may not be used in the interpolation operation, e.g., according to storage/non-storage of the feature region pixel of the previous frame in the registration memory, or portion of the registration memory that is controlling of which pixel information is used in interpolating pixels of the high definition frame corresponding to the feature region.

When the feature region pixel of the current frame is classified into the edge region, in operation S1030, it may be determined whether a difference of a pixel value between the feature region pixel of the edge region and a feature region pixel of a previous frame corresponding to the feature region pixel is less than the reference value of $Th_{edge}$. When the difference of the pixel value therebetween is less than $Th_{edge}$, in operation S1031, the above discussed matching operation of the feature region pixel of the edge region and the feature region pixel of the previous frame may be performed. However, when the difference of the pixel value therebetween exceeds $Th_{edge}$, in operation S1032, the feature region pixel of the previous frame may be excluded when performing the aforementioned matching operation, and similar to above, information regarding the feature region pixel may not be used in the interpolation operation, e.g., the feature region pixel of the previous frame may not be stored in the registration memory according to storage/non-storage of the feature region pixel of the previous frame in the registration memory as pixel information to be accessed during interpolation of pixels of the high definition frame corresponding to the feature region. According to one or more embodiments, to additionally prevent errors of the matching operation, an edge preserving low pass filter may be applied to the feature region pixel of the edge region, as illustrated in FIG. 13C. The low pass filter for edge protection, may further attempt to reduce registration error.

Figure 11:
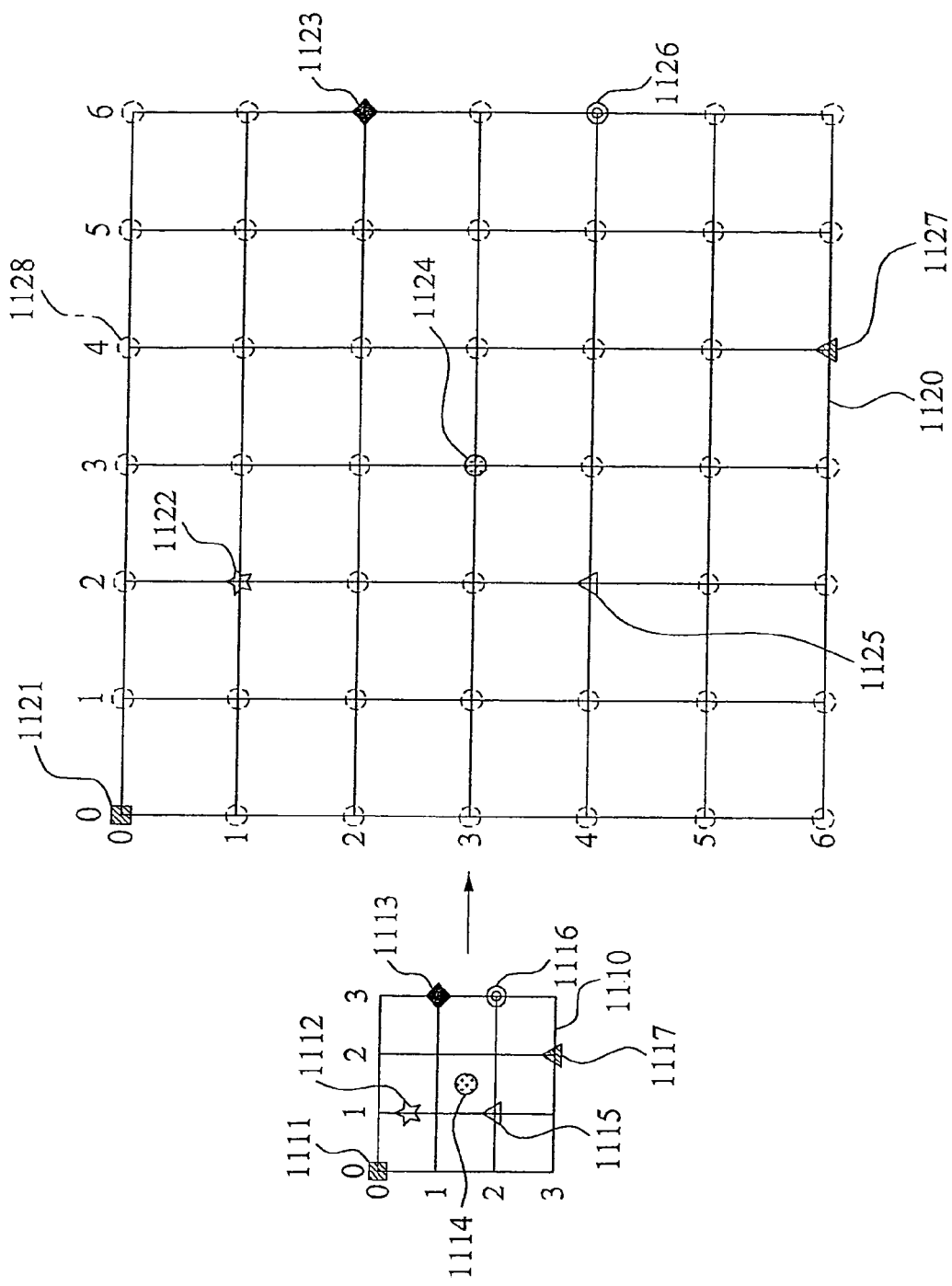
FIG. 11 illustrates a frame of a high definition video corresponding to a frame of a low definition video, according to one or more embodiments.

FIG. 11 illustrates a frame of a high definition video corresponding to a frame of a low definition video, according to one or more embodiments. As illustrated in FIG. 11, the illustrated pixels have been localized to the coordinate system of the current frame, i.e., the low definition frame of the low definition video, based on the above trajectory estimation, feature region pixel classification, and matching, as only examples. The localized coordinates may equally be obtained by an interpolation unit, such as the high resolution interpolation unit 1350 of FIGS. 13A-C, for example, merely from the registration memory, or they may be projected onto the current frame as shown in FIG. 11.

Referring to FIG. 11, a current frame 1110 of the low definition video, according to an embodiment, may have feature region pixels 1111, 1112, 1113, 1114, 1115, 1116, and 1117. The feature region pixel 1111 may have coordinates (0, 0), the feature region pixel 1112 may have coordinates (1, 0.5), the feature region pixel 1113 may have coordinates (3, 1), the feature region pixel 1114 may have coordinates (1.5, 1.5), the feature region pixel 1115 may have coordinates (1, 2), the feature region pixel 1116 may have coordinates (3, 2), and the feature region pixel 1117 may have coordinates (2, 3). Here, the coordinates are based upon sub-pixel units the current frame 1110, resulting in some pixels having half x-axis or y-axis coordinates, for example. Pixel values and locations, for example, of the feature region pixels 1111, 1112, 1113, 1114, 1115, 1116, and 1117 may be stored, as noted above. Similar to the illustration in FIG. 9 of adjacent pixels of feature region pixel 911 being represented with diamonds, triangles, and squares, representing the different frames including the respective adjacent pixels, FIG. 11 illustrates projected trajectory estimated feature region pixels, or classified feature region pixels being represented from different previous (or current) frames according to a diamond representing feature region pixel 1113, triangles representing feature region pixels 1115 and 1117, a square representing feature region pixel 1111, dotted circle representing pixel 1114, and the circle within a circle representing pixel 1116.

Accordingly, as noted, in one or more embodiments, the current frame 1110 of the low definition video may be a frame including a feature region pixel of the current frame 1110 and at least one feature region pixel corresponding to one or more previous frames of the current frame 1110, i.e., the feature region pixels of the previous frame may be projected onto the current frame 1110. In one or more embodiments, the feature region pixels 1111, 1112, 1113, 1114, 1115, 1116, and 1117 could alternatively be adjacent pixels of the feature region pixels of the current frame 1110 and/or adjacent pixels of the at least one feature region pixel of the previous frame projected onto the current frame 1110.

During the interpolation, when a high definition frame corresponding to the current frame 1110 of the low definition video is produced to have twice the resolution in comparison with that of the low definition video, feature region pixels 1121, 1122, 1123, 1124, 1125, 1126, and 1127 of a frame 1120 of the high definition video, corresponding to the feature region pixels 1111, 1112, 1113, 1114, 1115, 1116, and 1117 of the current frame 1110 of the low definition video, may have coordinates corresponding to those of the feature region pixels 1111, 1112, 1113, 1114, 1115, 1116, and 1117, with each x- and y-axis coordinate multiplied by two. That is, in the high definition frame 1120 of the high definition video, the feature region pixel 1121 of the frame 1120 may now have coordinates (0, 0), the feature region pixel 1122 may now have coordinates (2, 1), the feature region pixel 1123 may now have coordinates (6, 2), the feature region pixel 1124 may now have coordinates (3, 3), the feature region pixel 1125 may now have coordinates (2, 4), the feature region pixel 1126 may now have coordinates (6, 4), and the feature region pixel 1127 may now have coordinates (4, 6).

Figure 12:
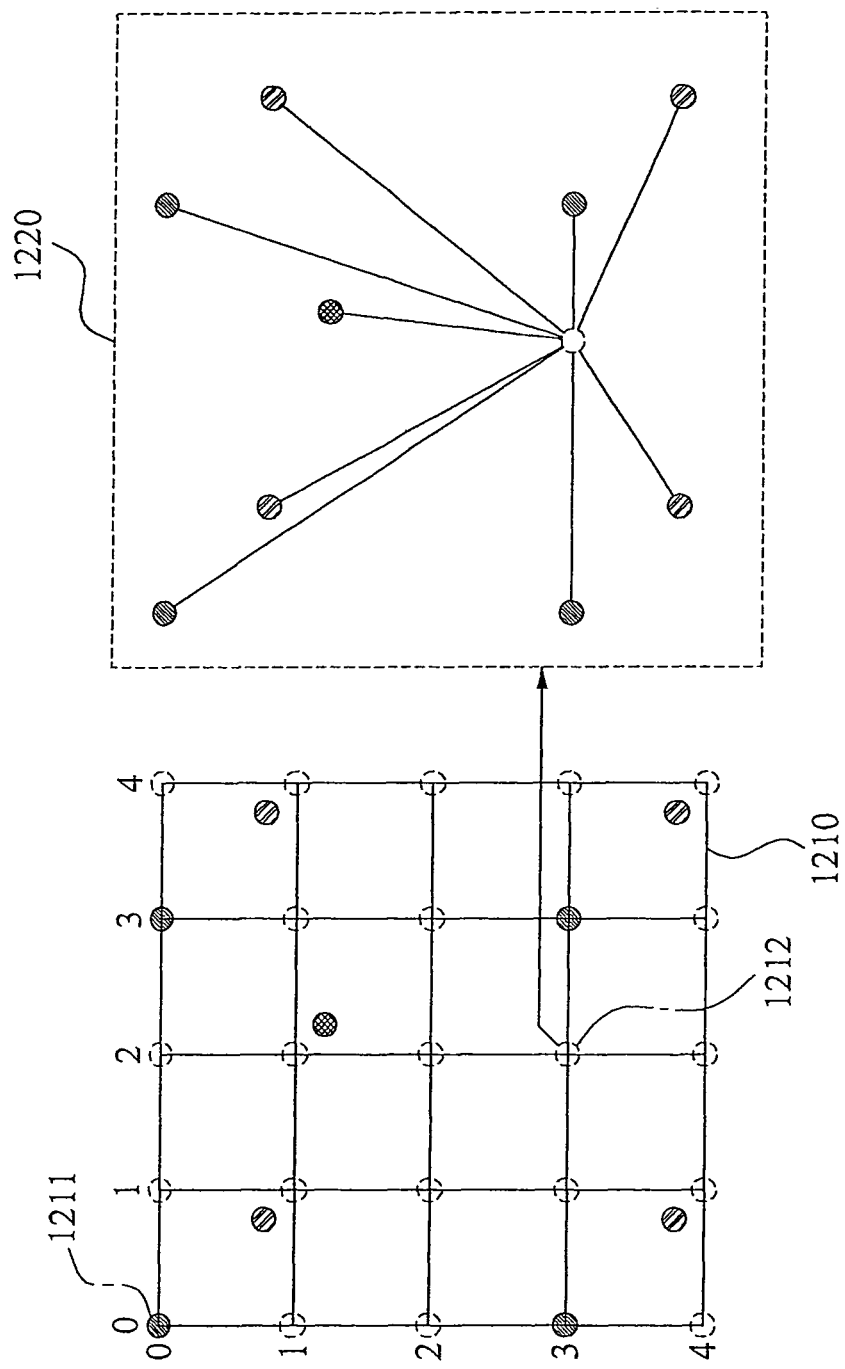
FIG. 12 illustrates performance of an interpolating of pixels of a frame of a high definition video, according to one or more embodiments.

A pixel value of a pixel 1128, which is different from the feature region pixels 1121, 1122, 1123, 1124, 1125, 1126, and 1127, may be obtained by interpolation, noting that the pixel values corresponding to any of the feature region pixels 1121, 1122, 1123, 1124, 1125, 1126, and 1127 in the high definition frame 1120 may equally be based on further interpolation operations. FIG. 12 below further discussed such an interpolation operation for pixel 1128, for example.

FIG. 12 illustrates performance of an interpolating of pixels of a frame of a high definition video, according to one or more embodiments.

Referring to FIG. 12, a frame 1210 of the high definition video may have a feature region pixel 1211 corresponding to a feature region pixel of a low definition video, and an interpolated pixel 1212, illustrated in FIG. 12 as the white pixel 1211. As illustrated in FIG. 12, the feature region pixel 1211 may already have a pixel value based upon the trajectory estimation. However, a pixel value of the white pixel 1212 may need to be obtained by interpolation.

Taking a correlation between the feature region pixel 1211 of the frame 1210 of the high definition video and the white pixel 1212 into account, the pixel value of the white pixel 1212 may be interpolated by:

$$I_{out}(x, y) = \sum_{i=1}^{n} w_i I_i$$

Here, $w_i$ denotes a weight. In one or more embodiments, the weight which may be represented as:

$$w_i = \frac{d_i^{-p}}{\sum_{i=1}^{n} d_i^{-p}}$$

Here, $d_i$ denotes a distance between a black pixel 1211 and the white pixel 1212, and p denotes a constant value controlling a magnitude of the distance. That is, the interpolation with respect to a pixel value of a frame of the high definition video may be performed based distance(s) between the to-be-interpolated pixel and near feature region pixels and potentially respective an adjacent pixel(s), acting as the weight. As shown in illustration 1220, the illustrated different distances between the white pixel 1211 and the near feature region pixels or respective adjacent pixels can be used to interpolate the pixel value of the white pixel 1211. The number and/or proximity of feature region pixels, and potentially corresponding adjacent or neighboring pixels, that are used for such an interpolating of the white pixel 1211 may be predefined or varied, e.g., based on available resources. Additionally, the interpolation of the white pixel 1211 may also be based on already interpreted pixels of the high definition frame.

Hereinafter, a producing of a high definition video from the low definition video, according to one or more embodiments will be further described.

In one or more embodiments, trajectory estimation with respect to a feature region pixel of an (i−1)-th frame (equated with the aforementioned frame(t-1)) of the low definition video may be performed to thereby determine a feature region pixel of an i-th frame (similarly equated with the aforementioned frame(t)) of the low definition video.

A feature region pixel of the i-th frame and at least one feature region pixel of a previous frame corresponding to the feature region pixel of the i-th frame may then be matched to determine pixel values of pixels of a frame of the high definition video corresponding to the i-th frame.

Accordingly, using interpolation, pixel values may be interpolated for pixels of the corresponding high definition frame that have not been determined, such as pixels between the feature region pixels from the low definition frame, between feature region pixels from previous low definition frames projected onto the low definition frame, or pixels that are overlapping, for example.

According to one or more embodiments, the feature region pixel of the (i−1)-th frame may have been trajectory-estimated from a feature region pixel of an (i−2)-th frame of the low definition video, or may have been a pixel within the (i−1)-th frame having a relatively high spatial spectrum. That is, a pixel of the (i−1)-th frame having been trajectory-estimated from a pixel determined as the feature region pixel in the (i−2)-th frame may also have been classified as a feature region pixel in the (i−1)-th frame, and remaining pixels of the (i−1)-th frame may have been classified into either of the feature region and the uniform region in accordance with their respective spatial spectrum, as discussed above.

Similarly, according to one or more embodiments, the feature region pixel of the (i−2)-th frame may have been trajectory-estimated from a feature region pixel of an (i−3)-th frame of the low definition video, or may have been a pixel within the (i−2)-th frame having a relatively high spatial spectrum. That is, a pixel of the (i−2)-th frame having been trajectory-estimated from a pixel determined as the feature region pixel in the (i−3)-th frame may also have been classified as a feature region pixel in the (i−2)-th frame, and remaining pixels of the (i−2)-th frame may have been classified into either of the feature region and the uniform region in accordance with their respective spatial spectrum, as discussed above.

Accordingly, the classification of pixels of a current frame as one of the feature region and the uniform region may be performed based on feature region pixels from at least one previous frame being trajectory estimated into the current frame, as feature region pixels of the current frame, and with the remaining pixels of the current frame being classified into either of the feature region or uniform region based on their respective spatial spectrum. A high definition frame can be produced from the low definition current frame by applying the known pixel information of the classified feature region pixels of the current frame and the known pixel information of the previous frames' feature region pixels, and potentially adjacent or neighboring pixels, e.g., based upon a selective matching operation, localizing the coordinates of the known pixel information from previous frames projecting the known pixel information for previous frames and the current frames into the high definition frame, and interpolating the pixels that remain to be determined in the high definition frame. In an embodiment, the interpolation may equally include interpolating the known pixel information of the feature region pixels, such as when two or more are estimated to be overlapping or are in close proximity in the high definition frame, such by the above described distance based interpolation with regard to the unknown pixels of the high definition frame.

The above reference to embodiments regarding a conversion of the definition or resolution of a current frame of a video, e.g., a low definition video being converted into a high definition video, are equally applicable to a single image being converted to a high definition or resolution image based upon additional information, such as pixel information and trajectory information of another or previous image, though the additional information is not required to be from another or previous image and may be information from a previous compression of the current image into a low definition image, noting that alternatives are equally available. Alternatively, one or more embodiments include a system and method compressing a high definition image based on a classification of the high definition image into one of the feature and uniform regions and a generated trajectory information for pixels classified into the feature region, based upon the above available classification operations, and a corresponding decompressing of the compressed low definition image based on the generated trajectory information and positions and values of feature region pixels, and potentially adjacent or neighboring pixels, corresponding to the low definition image, to thereby reproduce the high definition image based upon one or more of the described embodiments described herein.

Hereinafter, a method of producing the high definition video from the low definition video, according to one or more embodiments, will be further described.

First, a first frame of the low definition video may be input.

In an embodiment, the first frame may be divided into N×M-numbered blocks. In one or more embodiments, by adjusting a magnitude of N or M, a number of feature region pixels of the first frame may be adjusted.

Any, alone or in combination, of the aforementioned operations for classifying pixels of the first frame into either of the feature region and the uniform region may be performed, and pixel values and locations of the feature region pixels of the first frame may be stored. Also, the pixel value and location of pixels adjacent to the classified feature region pixels of the first frame may be stored. Similarly, in one or more embodiments, if the first frame has been divided into the N×M-numbered blocks the performing of the classifying of pixels of the first frame into either of the feature region and the uniform region may classify only a single pixel for each block as being a feature region pixel, thereby representing all pixels of the block, if at least one pixel of that block would be determined to be feature region pixel according to the aforementioned operations. The feature region pixel of the block may be a pixel of the block that meets the most criteria or has the greatest value relative to the respective reference values for the above mentioned classifying operations, as only an example. The remaining pixels of the same block as the classified feature region pixel may be classified as adjacent or neighboring pixels of the respective feature region pixel. Blocks of which no pixel would be determined to be a feature region pixel according to one or more of the aforementioned operations may be classified into the uniform region, along with all pixels of the respective blocks being classified into the uniform region.

Additionally, a second frame of the low definition video may be input.

According to one or more embodiments, the second frame may be divided into N×M-numbered blocks.

A trajectory estimation may be performed from respective feature region pixels of the first frame to thereby estimate a pixel in the second frame corresponding to the feature region pixel of the first frame. As discussed above, pixels that have been classified as uniform region pixels in the previous frame are not required for estimation of pixels of the feature region of the second frame, and thus trajectory estimation of only the feature region pixels of the first frame may be performed.

Additionally, according to one or more embodiments, the 'trajectory estimation' may include selecting a pixel having the highest correlation with a feature region pixel of the first frame and a pixel of the second frame, using information including an intensity value, a gradient value, a second differential value, a spatial spectrum value, and a pixel value of a pixel, and the like, as well as an SAM method of performing the trajectory estimation using an intensity difference, such as when the first or second frames have been divided into N×M-numbered blocks, as only examples.

According to one or more embodiments, the method may perform the trajectory estimation up to a sub-pixel unit in the first frame to thereby determine a sub-pixel of the second frame as the trajectory estimated feature region pixel. Information including an intensity value, a gradient value, a second differential value, a spatial spectrum value, and a pixel value of a pixel of the sub-pixel unit of the second frame may further be determined from one or more adjacent pixels using interpolation, as only examples.

In a case where there is a transition, occlusion, and the like detected or expected, the trajectory estimation may not be performed with respect to a pixel of the second frame corresponding to the feature region pixel of the first frame. In this case, there may be no pixel of the second frame corresponding to the feature region pixel of the first frame, and the pixel that would have been defined by the feature region pixel of the first frame may need to be represented by another pixel near the feature region pixel, e.g., another pixel within the same block when the first frame has been divided into N×M-numbered blocks.

Accordingly, according to one or more embodiments, a pixel of the second frame on which the trajectory estimation has been performed may be classified as a feature region pixel of the second frame, and a pixel value and location of the feature region pixel may be stored. Pixel values and locations of one or more adjacent pixels of the feature region pixel of the second frame may also be stored. Further, pixel values and locations of pixels of the second frame that have been classified into the feature region, though not estimated through trajectory estimation, may equally be stored, and pixel values and locations of one or more corresponding adjacent pixels may also be stored. Similar to above, if the second frame has been divided into the N×M-numbered blocks, the pixel values and locations of the remaining pixels of a block may be stored in addition to pixel value and location of the feature region pixel representing the block.

Thereafter, an i-th frame of the low definition video may be input.

According to one or more embodiments, the i-th frame may be divided into N×M-numbered blocks Trajectory estimation from a pixel classified as a feature region pixel in an (i−1)-th frame, such as the second frame when i equals 2, may then be performed to estimate pixels of the i-th frame corresponding to the feature region pixel of the (i−1)-th frame. The trajectory estimation may be performed up to a sub-pixel unit in the (i−1)-th frame to thereby estimate a sub-pixel of the i-th frame as the feature region pixel.

Thus, pixel values for respect to pixels of which pixel values have not been determined may be interpolated in a high definition frame of the high definition video corresponding to the i-th frame.

A frame of the high definition video corresponding to the i-th frame of the low definition video, e.g., with the estimated pixels and interpolated pixels, may thus be output. Similarly, frames such as an (i+1)-th frame, an (i+2)-th frame, and the like of the high definition video may be produced in real time.

Additionally, high definition video corresponding to plural high definition frames may be produced, e.g., by the high resolution interpolation unit 1350 of FIGS. 13A-C. The respective pixels in the uniform region of each frame may be projected to a high definition frame corresponding to the uniform region, e.g., by merely multiplying their x- and y-axes coordinates by a value. In one or more embodiments, the unknown pixels within the high definition frame corresponding to the uniform region may be estimated, e.g., with the interpolation of pixel values within the high definition frame being based only on the pixels from the same low definition frame that were projected onto the high definition frame corresponding to the uniform region.

In an embodiment, the interpolation for pixels in the high definition frame corresponding to the uniform region may be limited to interpolating pixels between the pixels classified into the uniform region that would not overlap pixels of a high definition frame corresponding to the feature region, and similarly the interpolation for pixels in the high definition frame of the feature region pixels may be limited to interpolating pixels that would not overlap pixels of the high definition frame corresponding to the uniform region, such that a merging of the high definition video based on the feature region and the high definition of the video based on the uniform region may be easily combined without further substantial interpolation. Alternatively, additional interpolations may be implemented for an overlap between the high definition frame corresponding to the feature region and the high definition frame corresponding to the uniform region. Likewise, interpolation may be implemented if a high definition video corresponding to the feature region is merged with a high definition video corresponding to the uniform region.

Accordingly, the high definition video corresponding to the feature region pixels and the high definition video corresponding to the uniform region pixels may then be merged, and a single high definition video may be output representing all portions of the input low definition video.

In one or more embodiments, in producing a high definition frame, a pixel estimating and/or an alternative interpolation technique for pixels corresponding to the uniform region of the low definition frame, may be used to produce the high-definition frame based on the uniform region, as long as the necessary processing and/or memory requirements for the pixel estimation and/or interpolating technique(s) of pixels classified into the uniform region are less and different from the estimation and/or interpolation process of the feature region, based upon those pixels of the uniform region being classified as being different from pixels of the feature region. In one or more embodiments, the producing of the high definition frame corresponding to the uniform region is based on there being no estimation operation for additional pixels of the low definition frame, and only an interpolation of pixels between the existing pixels classified into the uniform region, i.e., the high definition frame corresponding to the uniform region is derived from only pixel information provided within the uniform region of the low definition frame. Additionally, the pixels of each of the feature region and/or uniform region for each frame may equally be further classified into respective sub-regions, where selective estimation and/or interpolation may be performed. For example, though embodiments may be described as applying the same estimation and interpolation technique for all pixels within the feature region and the same interpolation technique for all pixels within the uniform region, respective estimation and/or interpolation techniques for pixels of the feature region and uniform region may be selectively different based upon additional factors, such as the location of each pixel within the current frame or potentially defined regions of interest, for example.

FIGS. 13A-C illustrate image processing systems producing a high definition image from a low definition image, according to one or more embodiments. According to one or more embodiments, the image processing systems of FIGS. 13A-C perform one or more of the embodiments described above.

As only examples, with reference to FIGS. 13A-B, the region classification unit 1320 may classify pixels of the low definition frame into the feature region and the uniform region, and store information of the classified feature region pixels, and neighboring pixels, in a registration memory. The classified uniform region pixels may also be stored, e.g., if the high resolution interpolation unit 1350 does not directly access the identified uniform region pixels from the low definition frame. Referring to FIG. 13C, the separately illustrated region classification units 1320 may be a single unit that performs classifications into both the feature region and the uniform region, or they may be separate units that individually classify pixels into the feature region and the uniform region. The arrangement of the plural region classifications 1320 of FIG. 13C is equally available to the embodiments of FIGS. 13A-B.

Additionally, the region classification unit 1320 may perform the above described division of the current frame into the N×M-numbered blocks, and respective classification of the same, and/or the review of minimal distances between feature region pixels as controlling of whether a current pixel is classified into the feature region or the uniform region, as only examples. The region classification unit 1320 may also control a minimal distance between feature region pixels, and selectively classify pixels within the minimal distance.

Referring to FIGS. 13A-C, the trajectory estimation unit 1330 may perform trajectory estimation of feature region pixels from previous frame(s) to the classified feature region pixels of the low definition frame and selectively store their trajectory estimated positions in the registration memory, potentially with the selective storing of the trajectory estimated positions in the registration memory further including a matching operation of the trajectory estimated feature region pixels of the low definition frame and the corresponding feature region pixels of the previous frame(s). The trajectory estimation of trajectory estimation unit 1310 may operate similarly to the described trajectory estimation unit 1330.

As illustrated in FIG. 13B, in one or more embodiments, a trajectory estimation may be performed by an trajectory estimation unit 1310 before the classifying of the pixels into the feature region or the uniform region by the region classification unit 1320, and any resulting trajectory estimated pixels of the low definition frame may be classified as feature region pixels of the low definition frame and a classification of only the remaining pixels into the feature region or uniform region would be performed by the region classification unit 1320, i.e., the trajectory estimated pixel may automatically be classified into the feature region as it was estimated from a feature region pixel of a previous frame. Information of the trajectory estimated pixel may be stored. Accordingly, the region classification unit 1320 may not perform any operations on the trajectory estimated pixel and merely proceed with classifying a next pixel. In this embodiment, the trajectory estimation unit 1310 is positioned before the region classification unit 1320, and another trajectory estimation unit 1330 is shown following the region classification unit. Here, the trajectory estimation unit 1310 and the trajectory estimation unit 1330 may be the same unit, they may perform different duties, such as the trajectory estimation unit 1330 potentially updating a trajectory, or the trajectory estimation unit 1330 may not be needed. In the embodiment of FIG. 13B, the trajectory estimation unit 1310 may not be implemented when trajectory information is not available, such as when the input frame is a first frame of a series of frames and there is no previous frame information available. However, when the next frame is input, the trajectory estimation unit 1310 may be operated, as trajectory information from the previous frame may now be available.

Once identified, pixel values and locations of the trajectory estimated pixel of the low definition frame, and adjacent or neighboring pixels, as well as the pixel value and location of the particular feature region pixel of the previous frame whose trajectory estimated the trajectory estimated pixel of the low definition frame may be used for matching the feature region pixels of the current frame with feature region pixels of several previous frames. By knowing the particular feature pixel of the previous frame, corresponding feature region pixels from all previous frames may also be available. For example, if the feature region pixel of the previous frame was also a result of trajectory estimation, from a feature region pixel of a further previous frame, the pixel values and locations of feature region pixel of the further previous frame may have been previously stored. Based upon the trajectory estimation of the pixel in the low definition frame, from the feature region pixel of the previous frame, a related lineage of previous feature region pixels from previous frames may be know. Based upon this known lineage, pixel information from several previous frames can be easily projected to an area of the high definition frame merely by accessing the stored information of these feature region pixels and their trajectory information, e.g., identifying which feature region pixel of a previous frame they were estimated from.

The trajectory estimation unit 1310 in FIG. 13B and trajectory estimation units 1330 in FIGS. 13A-C may selectively not perform the trajectory estimation based upon a detected transition, occlusion, and the like. The trajectory estimation unit 1310 or trajectory estimation units 1330 may also be incorporated with the region classification unit 1320. Further, in one or more embodiments, the trajectory estimation unit 1330 may only perform trajectory estimation on feature region pixels, i.e., pixels that are classified into the feature region by the region classification unit 1320.

The registration unit 1340 may control which pixel value information is ultimately available for interpolation, and further may organize the feature region pixel information and respective trajectories for subsequent frame conversions. For example, the registration unit 1340 may perform the above matching operation. The registration unit 1340 of FIG. 13C is illustrated as including at least a texture registration unit 1342, an edge registration unit 1344, and a low pass filter 1346. The operations of the texture registration unit 1342, edge registration unit 1344, and low pass filter 1346 are the same as those discussed above.

Similar to the registration process discussed above regarding FIG. 10, the registration unit 1340, and potentially texture registration unit 1342, edge registration unit 1344, and low pass filter 1346, included with the registration unit 1340, may limit the matching based on a comparison between respective feature region pixels of the previous frame and trajectory estimated pixels of the current frame. In one or more embodiments, respective matching may proceed based on a feature region pixel of a previous frame according to a comparison of pixel value of the feature region pixel of the previous frame stored in a memory, such as the registration memory, and a brightness of the trajectory estimated pixel of the current frame, for example. In one or more embodiments, the registration unit 1340 of FIG. 13A, as only an example, may perform this a comparison.

The high resolution interpolation unit 1350 of FIGS. 13A-C may produce a high definition frame corresponding to the feature region and a high definition frame corresponding to the uniform region pixels, and merge the two high definition frames together to generate the high definition video. The high resolution interpolation unit 1350 may alternatively produce separate high definition videos for the feature region and the uniform region according to their respective generated frames, and merge the separate high definition videos.

Similar to above, and again referring to FIGS. 13A-C, in one or more embodiments, the high resolution interpolation unit 1350 may directly project feature region pixels from previous frames, and potentially respective adjacent or neighboring pixels, based on storage of pixel information of feature region pixels of previous frames in the registration memory, e.g., as described in the above matching operation, and stored pixel information of feature region pixels of the low definition frame, and potentially respective adjacent or neighboring pixels, that have been classified into the feature region in the low definition frame. The high resolution interpolation unit 1350 may further interpolate the remaining pixel values for the high definition frame corresponding to the feature region based on the feature region pixels from the previous frames, respective adjacent or neighboring pixels, and the classified feature region pixels, and respective adjacent or neighboring pixels, of the low definition frame. The registration memory may be external to the image processing systems or included in any of the trajectory estimation unit 1310, the region classification unit 1320, the trajectory estimation unit 1330, registration unit 1340, or high resolution interpolation unit 1350. The high resolution interpolation unit may selectively access the registration memory when interpolating pixels in the high definition frame corresponding to feature region pixels of the low definition frame and previous frames. The production of the high definition frame corresponding to the feature region and the high definition frame corresponding to the uniform region may be produced in parallel.

Further, the high resolution interpolation unit 1350 may merge the separately produced high definition frames respectively corresponding to the feature region and the uniform region, merge high definition videos produced by a respective sequencing of each of plural high definition frames corresponding to the feature region and a sequencing of each of plural high definition frames corresponding to the uniform region, e.g., as respectively generated from plural corresponding frames of a low definition video input to the image processing system. In one or more embodiments, the high resolution interpolation unit 1350 may merely perform the interpolation of a single high definition frame differently based upon registration information, provided from trajectory estimation, classification, and matching for a feature region of an input low definition frame and previous low definition frame(s), for example, and pixel information for pixels within the uniform region of the input low definition frame, e.g., such that a complete high definition frame is generated from pixel information derived for the feature region and pixel information from a uniform region, e.g., without producing a high definition feature region frame and a high definition uniform region frame. Plural single high definition frames may then be merged to generate the high definition video.

In the image processing system of FIG. 13B, as only an example, each of the trajectory estimation unit 1310, region classification unit 1320, trajectory estimation unit 1330, registration unit 1340, and high resolution interpolation unit 1350 may have respective buffers, or there may be a single buffer for all units, and information from these buffers may selectively be provided to a registration memory, or a part of the registration memory that is looked to by the high resolution interpolation unit 1350 during an interpolation operation for pixels for the high definition frame corresponding to the feature region.

For example, feature region pixels from the previous images that are matched by the above matching operation may be identified in the registration memory, and potentially corresponding adjacent or neighboring pixels, such that the high resolution interpolation unit 1350 of FIGS. 13A-C selectively chooses the appropriate stored information and performs the interpolation of pixels within the high definition frame corresponding to the feature region.

Referring to FIGS. 13A-C, if a compressed image is input, e.g., of a high definition image that has been compressed based on a classification of the high definition image into either of the feature and uniform regions and a generated trajectory information for pixels classified into the feature region, based upon one or more of the above available classification operations, the compressed image may be decompressed to a restored high definition or resolution image based upon input trajectory information and positions and values of feature region pixels, and potentially corresponding adjacent or neighboring pixels, as defined by the compressing of the high definition image, to thereby reproduce the high definition image based upon one or more of the above described embodiments. For example, the defined information may be provided to the registration memory of FIGS. 13A-C, region classification unit 1320 may perform region classification of the input image, the trajectory estimation units 1310 and 1330 may perform trajectory estimation based upon the provided information stored in the registration memory, the registration unit 1340 (and potentially texture registration unit 1342, edge registration unit 1344, and low pass filter 1346) may perform a registration operation of the image, e.g., such as a selective matching of the feature region pixels of the input image and feature region pixel information stored in the registration memory, and the high resolution interpolation unit 1350 may generate the restored high definition image from interpolated pixel information of the uniform region and interpolated pixel information of the feature region.

In one or more embodiments, apparatus, system, and unit descriptions herein include one or more hardware processing elements. For example, each described unit may include one or more processing elements performing the described operation, desirable memory, and any desired hardware input/output transmission devices. Further, the term apparatus should be considered synonymous with elements of a physical system, not limited to a single enclosure or all described elements embodied in single respective enclosures in all embodiments, but rather, depending on embodiment, is open to being embodied together or separately in differing enclosures and/or locations through differing hardware elements.

In addition to the above described embodiments, embodiments can also be implemented through computer readable code/instructions in/on a non-transitory medium, e.g., a computer readable medium, to control at least one processing device, such as a processor or computer, to implement any above described embodiment. The medium can correspond to any defined, measurable, and tangible structure permitting the storing and/or transmission of the computer readable code.

The media may also include, e.g., in combination with the computer readable code, data files, data structures, and the like. One or more embodiments of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Computer readable code may include both machine code, such as produced by a compiler, and files containing higher level code that may be executed by the computer using an interpreter, for example. The media may also be a distributed network, so that the computer readable code is stored and executed in a distributed fashion. Still further, as only an example, the processing element could include a processor or a computer processor, and processing elements may be distributed and/or included in a single device.

The computer-readable media may also be embodied as at least one application specific integrated circuit (ASIC) or Field Programmable Gate Array (FPGA), which executes (processes like a processor) program instructions.

While aspects of the present invention has been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments. Suitable results may equally be achieved if the described techniques are performed in a different order and/or if components in a described system, architecture, device, or circuit are combined in a different manner and/or replaced or supplemented by other components or their equivalents.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. A method of producing a high definition video from a low definition video, the method comprising:

individually classifying pixels or blocks of a current frame of the low definition video into a feature region and a uniform region in accordance with a respective spatial frequency of each pixel or block, with pixels or blocks classified into the feature region respectively being feature region pixels or blocks; and producing a high definition video corresponding to the feature region based on a plurality of frames of the low definition video with respect to the feature region and based on pixel value information from at least one previous frame to the current frame, and producing a high definition video corresponding to the uniform region using interpolation at least between pixels or blocks of the current frame classified into the uniform region, wherein the classifying of the pixels or blocks of pixels of the current frame respectively into the feature region and the uniform region includes classifying a pixel or block of pixels of the current frame having a spatial frequency equal to or greater than a first reference value into the feature region, and classifying a pixel or block of pixels of the current frame having a spatial frequency equal to or less than a second reference value, less than the high spatial frequency, into the uniform region, the producing of the high definition video corresponding to the feature region includes determining pixel values of pixels of a frame of the high definition video corresponding to the feature region by matching feature region pixels of the current frame with feature region pixels of the at least one previous frame determined to correspond to the feature region pixels of the current frame, the determining of the pixel values matches the feature region pixels of the at least one previous frame, based upon a determined difference between the pixel values of the feature region pixels of the current frame and pixel values of corresponding feature region pixels of the at least one previous frame being a third reference value or less, and the third reference value varies depending on whether a feature region pixel of the current frame is determined to be included in a texture region or an edge region.

2. The method of claim 1, wherein the classifying includes classifying, as the feature region pixels, pixels of the current frame on which a trajectory estimation is performed from feature region pixels of a feature region of a previous frame.

3. The method of claim 1, wherein the classifying of the pixels or blocks of the current frame respectively into one of the feature region and the uniform region is controlled to maintain a minimal distance between the feature region pixels.

4. The method of claim 3, wherein, when a first pixel of the current frame is classified as one of the feature region pixels, the classifying includes selectively classifying second pixels of the current frame separated by at least the minimal distance from the first pixel into the feature region and the uniform region in accordance with a spatial frequency of each second pixel.

5. The method of claim 4, wherein the classifying further comprises not classifying second pixels, which are not separated by at least the minimal distance from the first pixel, into either the feature region or the uniform region.

6. The method of claim 1, further comprising:
dividing the current frame into N×M-numbered blocks; and
classifying for each N×M-numbered block, as one of the feature region pixels, a pixel having a greatest gradient value among pixels of each respective N×M-numbered block, with the greatest gradient value being equal to or greater than a gradient reference value.

7. The method of claim 1, wherein the classifying of the pixels or blocks of pixels of the current frame respectively into the feature region and the uniform region includes classifying a pixel of the current frame into the feature region when a difference between a pixel value of the pixel of the current frame and a pixel value of an adjacent pixel of the current frame is greater than or equal to the third reference value, and classifying the pixel of the current frame into the uniform region when the difference is less than the third reference value.

* * * * *